United States Patent
Murray et al.

(10) Patent No.: US 12,513,600 B2
(45) Date of Patent: Dec. 30, 2025

(54) SI ACQUISITION AND PAGING FOR REDUCED CAPABILITY NR DEVICES

(71) Applicant: INTERDIGITAL PATENT HOLDINGS, INC., Wilmington, DE (US)

(72) Inventors: Joseph Murray, Schwenksville, PA (US); Pascal Adjakple, Great Neck, NY (US); Mohamed M. Awadin, Plymouth Meeting, PA (US); Kyle Pan, Saint James, NY (US); Rocco Di Girolamo, Laval (CA); Zhuo Chen, Claymont, DE (US); Yifan Li, Conshohocken, PA (US); Allan Tsai, Boonton, NJ (US); Patrick Svedman, Stockholm (SE); Guodong Zhang, Woodbury, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 419 days.

(21) Appl. No.: 18/011,042

(22) PCT Filed: Jun. 18, 2021

(86) PCT No.: PCT/US2021/038057
§ 371 (c)(1),
(2) Date: Dec. 16, 2022

(87) PCT Pub. No.: WO2021/257971
PCT Pub. Date: Dec. 23, 2021

(65) Prior Publication Data
US 2023/0224800 A1    Jul. 13, 2023

Related U.S. Application Data

(60) Provisional application No. 63/041,796, filed on Jun. 19, 2020.

(51) Int. Cl.
H04W 48/12 (2009.01)
H04W 72/1273 (2023.01)
H04W 72/232 (2023.01)

(52) U.S. Cl.
CPC ....... *H04W 48/12* (2013.01); *H04W 72/1273* (2013.01); *H04W 72/232* (2023.01)

(58) Field of Classification Search
CPC ............. H04W 48/12; H04W 72/1273; H04W 72/232; H04W 88/02
See application file for complete search history.

(56) References Cited

U.S. PATENT DOCUMENTS

2019/0045419 A1* 2/2019 Shrestha ........... H04W 36/0072
2019/0150155 A1* 5/2019 Chatterjee ............... H04L 1/004
370/335

(Continued)

FOREIGN PATENT DOCUMENTS

WO   2017/019133 A1   2/2017
WO   2020/069162 A1   4/2020

OTHER PUBLICATIONS

3GPP TR 22.804, Technical Specification Group Services and System Aspects; Study on Communication for Automation in Vertical Domains (Release 16), V16.2.0, 2018, 165 pages.

(Continued)

*Primary Examiner* — Hoang-Chuong Q Vu
(74) *Attorney, Agent, or Firm* — Flaster Greenberg P.C.

(57) ABSTRACT

Methods for a reduced capability New Radio (NR) device to acquire System Information (SI) transmitted by a cell, where a Radio Resource Control (RRC) message comprised of one or more Bandwidth Reduced System Information Blocks (e.g., SIB1-BR, SIB2-BR, etc.) is received by the NR device using an SI Narrowband.

20 Claims, 41 Drawing Sheets

(56) References Cited

U.S. PATENT DOCUMENTS

| | | | | |
|---|---|---|---|---|
| 2020/0021998 | A1* | 1/2020 | Baldemair | H04W 16/14 |
| 2020/0163032 | A1* | 5/2020 | Su | H04L 5/0053 |
| 2021/0007066 | A1* | 1/2021 | Lin | H04W 72/53 |
| 2021/0127375 | A1* | 4/2021 | Hoglund | H04L 5/0053 |
| 2021/0329574 | A1* | 10/2021 | Ang | H04L 5/0037 |
| 2022/0158793 | A1* | 5/2022 | Selvaganapathy | H04L 27/2602 |
| 2022/0232496 | A1* | 7/2022 | Kim | H04L 5/0053 |
| 2022/0264430 | A1* | 8/2022 | Kim | H04W 48/12 |
| 2022/0361155 | A1* | 11/2022 | Liu | H04L 5/0048 |
| 2023/0071890 | A1* | 3/2023 | Jiang | H04W 16/14 |

OTHER PUBLICATIONS

3GPP TR 22.832, Technical Specification Group Services and System Aspects; Study on enhancements for cyber-physical control applications in vertical domains; Stage 1(Release 17), V17.1.0, Dec. 2019, 91 Pages.

3GPP TS 22.104, Service requirements for cyber-physical control applications in vertical domains; Stage 1 (Release 17), V17.2.0, Dec. 2019, 71 pges.

3GPP TS 22.261, Technical Specification Group Services and System Aspects; Service requirements for the 5G system; Stage 1 (Release 17), V17.2.0, Mar. 2020, 83 pages.

3GPP TS 23.501, System architecture for the 5G System (5GS); Stage 2 (Release 16), V16.4.0, Mar. 2020, 430 Pages.

3GPP TS 38.212, NR; Multiplexing and channel coding (Release 16), V16.1.0, Mar. 2020, 146 Pages.

3GPP TS 38.213, Physical layer procedures for control (Release 16), V16.1.0, Mar. 2020, 155 Pages.

3GPP TS 38.214, NR; Physical layer procedures for data (Release 16), V16.1.0, Mar. 2020, 151 Pages.

3GPP TS 38.300, NR; NR and NG-RAN Overall Description; Stage 2 (Release 16), V16.0.0, Dec. 2019, 101 Pages.

3GPP TS 38.304, User Equipment (UE) procedures in Idle mode and RRC Inactive state (Release 16), V16.0.0, Mar. 2020, 38 Pages.

3GPP TS 38.331, Radio Resource Control (RRC) protocol specification (Release 16), V16.0.0, Mar. 2020, 835 Pages.

Intel Corporation: "Clarification on Bandwidth Reduced operation", 3GPP Draft; 36331_CR3030R2_(REL-14)_R2-17O9824, 3rd Generation Partnership Project (3GPP), Mobile Competence Centre ; 650, Route Deslucioles ; F-06921 Sophia-Antipolis Cedex; France vol. RAN WG2, No. Berlin, Germany; Aug. 21, 2017-Aug. 25, 2017, Sep. 10, 2017.

Lenovo et al: "BWP impact on idle/inactive state," 3GPP Draft; R2-1800779 BWP Impact on Idle and Inactive State, 3rd Generation Partnership Project (3GPP), Mobile Competence Centre ; 650, Route Deslucioles ; F-06921 Sophia-Antipolis Cedex; France vol. RAN WG2, No. Vancouver, Canada; Jan. 22, 2018-Jan. 26, 2018, Jan. 11, 2018.

RP-193238, New SID on Support of Reduced Capability NR Devices, Dec. 2019, 5 Pages.

* cited by examiner

| LTE System BW including Guard Bands | Total Number of PRBs in System BW | Number of Narrowbands | PRBs not Belonging to Any Narrowband |
| --- | --- | --- | --- |
| 1.4 | 6 | 1 | 0 |
| 3 | 15 | 2 | 3 (1 on each edge plus 1 at center) |
| 5 | 25 | 4 | 1 (at center) |
| 10 | 50 | 8 | 2 (1 on each edge) |
| 15 | 75 | 12 | 3 (1 on each edge plus 1 at center) |
| 20 | 100 | 16 | 4 (2 on each edge) |

FIG. 4

| schedulingInfoSIB1-BR | SIB1 Transport Block Size | Number of PDSCH Repetitions in an 80 ms period |
|---|---|---|
| 0 | MTC not supported in the cell | |
| 1 | 208 | 4 |
| 2 | | 8 |
| 3 | | 16 |
| 4 | 256 | 4 |
| 5 | | 8 |
| 6 | | 16 |
| 7 | 328 | 4 |
| 8 | | 8 |
| 9 | | 16 |
| 10 | 504 | 4 |
| 11 | | 8 |
| 12 | | 16 |
| 13 | 712 | 4 |
| 14 | | 8 |
| 15 | | 16 |
| 16 | 936 | 4 |
| 17 | | 8 |
| 18 | | 16 |
| 19-31 | Reserved | |

FIG. 7

| Information | Size (bits) | Possible Settings |
|---|---|---|
| Flag for paging/direct indication | 1 | Paging or direct indication (If this flag bit indicates direct indication then the remaining DCI content is according to Table 4. |
| PDSCH narrowband | $\left\lceil \log_2 \left\lceil \frac{N_{RB}^{DL}}{6} \right\rceil \right\rceil$ | Any narrowband in the system bandwidth |
| PDSCH TBS | 3 | {40, 56, 72, 120, 136, 144, 176, 208} bits |
| Number of PDSCH repetitions | 3 | One of the following ranges, depending on the setting of the DCI field "Number of MPDCCH repetitions":<br>00: {1, 2, 4, 8, 16, 32, 64, 128}<br>01: {4, 8, 16, 32, 64, 128, 192, 256}<br>10: {32, 64, 128, 192, 256, 384, 512, 768}<br>11: {192, 256, 384, 512, 768, 1024, 1536, 2048} |
| Number of MPDCCH repetitions | 2 | One of the following ranges, depending on the setting of the SIB2 parameter for max number of repetitions Rmax:<br>Rmax = 1: {1}<br>Rmax = 2: {1, 2}<br>Rmax = 4: {1, 2, 4}<br>Rmax = 8: {1, 2, 4, 8}<br>Rmax = 16: {1, 4, 8, 16}<br>Rmax = 32: {1, 4, 16, 32}<br>Rmax = 64: {2, 8, 32, 64}<br>Rmax = 128: {2, 16, 64, 128}<br>Rmax = 256: {2, 16, 64, 256} |

FIG. 8

| Bit | Direct Indication information |
|---|---|
| 1 | systemInfoModification |
| 2 | etws-Indication |
| 3 | cmas-Indication |
| 4 | eab-ParamModification |
| 5 | systemInfoModification-eDRX |
| 6 | uac-ParamModification |
| 6, 7, 8 | Not used, and shall be ignored by UE if received. |

FIG. 9

*Exemplary SchedulingInfo IE Used to Configure SI-NB*

```
SchedulingInfo ::=            SEQUENCE {
  si-BroadcastStatus            ENUMERATED {broadcasting,
                                            notBroadcasting},
  si-Periodicity                ENUMERATED {rf8, rf16, rf32, rf64,
                                            rf128, rf256, rf512},
  sib-MappingInfo               SIB-Mapping,
  si-frequencyDomainResources   BIT STRING (SIZE(45))
}
```

FIG. 11

*Alternative SchedulingInfo IE Used to Configure SI-NB*

```
SchedulingInfo ::=        SEQUENCE {
  si-BroadcastStatus        ENUMERATED {broadcasting, notBroadcasting},
  si-Periodicity            ENUMERATED {rf8, rf16, rf32, rf64, rf128, rf256, rf512},
  sib-MappingInfo           SIB-Mapping,
  si-narrowband             INTEGER (1..45)
}
```

FIG. 12

*SchedulingInfo IE Used to Configure SI-NB Corresponding to a BWP*

```
SchedulingInfo ::=            SEQUENCE {
  si-BroadcastStatus            ENUMERATED {broadcasting, notBroadcasting},
  si-Periodicity                ENUMERATED {rf8, rf16, rf32, rf64, rf128, rf256, rf512},
  sib-MappingInfo               SIB-Mapping,
  si-BWP                        INTEGER (1..45)
}
```

FIG. 14

| Bit Field | System Information Indicator |
|---|---|
| 00 | SIB1 |
| 01 | SI Message |
| 10 | SIB1-BR |
| 11 | BR SI Message |

FIG. 15

*Exemplary RRCSystemInfoRequest Used for On Demand Request of a BR SI Message*

```
RRCSystemInfoRequest   ::=    SEQUENCE {
  criticalExtensions           CHOICE {
    rrcSystemInfoRequest         RRCSystemInfoRequest-IEs,
    criticalExtensionsFuture     SEQUENCE {}
  }
}

RRCSystemInfoRequest-IEs ::=  SEQUENCE {
  requested-SI-List            BIT STRING (SIZE (maxSI-Message)),
                                        --32bits
  br-SI-request                BOOLEAN,
  spare                        BIT STRING (SIZE (11))
}
```

FIG. 16

*Exemplary SchedulingInfo IE Used for Semi-Static Scheduling of a PDSCH Carrying an SI Message*

```
SchedulingInfo ::=              SEQUENCE {
  si-BroadcastStatus              ENUMERATED {broadcasting,
                                              notBroadcasting},
  si-Periodicity                  ENUMERATED {rf8, rf16, rf32, rf64, rf128,
                                              rf256, rf512},
  sib-MappingInfo                 SIB-Mapping,
  si-TBS                          ENUMERATED {b152, b208, b256, b328, b408,
                                              b504, b600, b712, b808, b936
  si-frequencyDomainResources     BIT STRING (SIZE(45)),
```

FIG. 23

```
SI-SchedulingInfo ::=      SEQUENCE {
  schedulingInfoList         SEQUENCE (SIZE (1..maxSI-Message)) OF
                                          SchedulingInfo,
  si-WindowLength            ENUMERATED {s5, s10, s20, s40, s80, s160,
                                          s320, s640, s1280},
  si-RequestConfig           SI-RequestConfig         OPTIONAL,    -- Cond MSG-
                                          1
  si-RequestConfigSUL        SI-RequestConfig         OPTIONAL,    -- Cond SUL-
                                          MSG-1
  systemInformationAreaID    BIT STRING (SIZE (24)    OPTIONAL,    -- Need R
  si-freqHoppingControl      ENUMERATED {on,off},
  si-HoppingOffset           INTEGER {1..maxAvailableNBs},
  si-HoppingInterval         INTEGER {1..64},
  si-NumHoppingNBs           ENUMERATED {n2, n4},
  ...
}

SchedulingInfo ::=         SEQUENCE {
  si-BroadcastStatus         ENUMERATED {broadcasting, notBroadcasting},
  si-Periodicity             ENUMERATED {rf8, rf16, rf32, rf64, rf128,
                                          rf256, rf512},
  sib-MappingInfo            SIB-Mapping,
  si-narrowband              INTEGER (0..32)
}
```

FIG. 30

*Exemplary PCCH-Config IE Used for Configuring Frequency Hopping Parameters*

```
PCCH-Config ::=          SEQUENCE {
  defaultPagingCycle     PagingCycle,
  nAndPagingFrameOffset  CHOICE {
    oneT                   NULL,
    halfT                  INTEGER (0..1),
    quarterT               INTEGER (0..3),
    oneEighthT             INTEGER (0..7),
    oneSixteenthT          INTEGER (0..15)
  },
  ns                     ENUMERATED {four, two, one}, firstPDCCH-MonitoringOccasionOfPO  CHOICE {
     sCS15KHZoneT
        SEQUENCE (SIZE (1..maxPO-perPF)) OF INTEGER (0..139),
     sCS30KHZoneT-SCS15KHZhalfT
        SEQUENCE (SIZE (1..maxPO-perPF)) OF INTEGER (0..279),
     sCS60KHZoneT-SCS30KHZhalfT-SCS15KHZquarterT
        SEQUENCE (SIZE (1..maxPO-perPF)) OF INTEGER (0..559),
     sCS120KHZoneT-SCS60KHZhalfT-SCS30KHZquarterT-SCS15KHZoneEighthT
        SEQUENCE (SIZE (1..maxPO-perPF)) OF INTEGER (0..1119),
     sCS120KHZhalfT-SCS60KHZquarterT-SCS30KHZoneEighthT-
SCS15KHZoneSixteenthT
        SEQUENCE (SIZE (1..maxPO-perPF)) OF INTEGER (0..2239),
     sCS120KHZquarterT-SCS60KHZoneEighthT-SCS30KHZoneSixteenthT
        SEQUENCE (SIZE (1..maxPO-perPF)) OF INTEGER (0..4479),
     sCS120KHZoneEighthT-SCS60KHZoneSixteenthT
        SEQUENCE (SIZE (1..maxPO-perPF)) OF INTEGER (0..8959),
     sCS120KHZoneSixteenthT
        SEQUENCE (SIZE (1..maxPO-perPF)) OF INTEGER (0..17919)
  } OPTIONAL, -- Need R freqHoppingControl   ENUMERATED {on,off},
  HoppingOffset        INTEGER {1..maxAvailableNBs},
  HoppingInterval      INTEGER {1..64},
  NumHoppingNBs        ENUMERATED {n2, n4},
  ...
}
```

FIG. 34

*Exemplary PCCH-Config IE Used for Configuring Frequency Hopping Parameters*

```
PCCH-Config ::=            SEQUENCE {
  defaultPagingCycle        PagingCycle,
  nAndPagingFrameOffset     CHOICE {
    oneT                      NULL,
    halfT                     INTEGER (0..1),
    quarterT                  INTEGER (0..3),
    oneEighthT                INTEGER (0..7),
    oneSixteenthT             INTEGER (0..15)
  },
  ns                        ENUMERATED {four, two, one}, firstPDCCH-MonitoringOccasionOfPO  CHOICE {
     sCS15KHZoneT
        SEQUENCE (SIZE (1..maxPO-perPF)) OF INTEGER (0..139),
     sCS30KHZoneT-SCS15KHZhalfT
        SEQUENCE (SIZE (1..maxPO-perPF)) OF INTEGER (0..279),
     sCS60KHZoneT-SCS30KHZhalfT-SCS15KHZquarterT
        SEQUENCE (SIZE (1..maxPO-perPF)) OF INTEGER (0..559),
     sCS120KHZoneT-SCS60KHZhalfT-SCS30KHZquarterT-SCS15KHZoneEighthT
        SEQUENCE (SIZE (1..maxPO-perPF)) OF INTEGER (0..1119),
     sCS120KHZhalfT-SCS60KHZquarterT-SCS30KHZoneEighthT-
SCS15KHZoneSixteenthT
        SEQUENCE (SIZE (1..maxPO-perPF)) OF INTEGER (0..2239),
     sCS120KHZquarterT-SCS60KHZoneEighthT-SCS30KHZoneSixteenthT
        SEQUENCE (SIZE (1..maxPO-perPF)) OF INTEGER (0..4479),
     sCS120KHZoneEighthT-SCS60KHZoneSixteenthT
        SEQUENCE (SIZE (1..maxPO-perPF)) OF INTEGER (0..8959),
     sCS120KHZoneSixteenthT
        SEQUENCE (SIZE (1..maxPO-perPF)) OF INTEGER (0..17919)
  } OPTIONAL,  -- Need R freqHoppingControl        ENUMERATED {on,off},
  HoppingOffset             INTEGER {1..maxAvailableNBs},
  HoppingInterval           INTEGER {1..64},
  NumHoppingNBs             ENUMERATED {n2, n4},
  ...
}
```

FIG. 35

SI ACQUISITION AND PAGING FOR REDUCED CAPABILITY NR DEVICES

CROSS-REFERENCE TO RELATED APPLICATIONS

This application is the National Stage Application of International Patent Application No. PCT/US2021/038057, filed Jun. 18, 2021, which claims the benefit of U.S. Provisional Application No. 63/041,796, filed Jun. 19, 2020, entitled "SI Acquisition and Paging for Reduced Capability NR Devices," the contents of which are hereby incorporated by reference in its entirety.

BACKGROUND

Existing and proposed telecommunications networks and subnetwork, may operate in accordance with various standards, such as LTE, 4G, 5G, and 3GPP, to support diverse applications, such as live communication, entertainment media transmission, computer data transfer, and Internet-of-things (IoT), Web-of-things, and machine-to-machine (M2M) operations. Various standards include mechanisms for defining bandwidth of network devices.

SUMMARY

To reduce cost and complexity, reduced capability New Radio (NR) devices are expected to have a narrower bandwidth (BW) compared to regular NR devices. In accordance with the SID on Support of Reduced Capability NR Devices, the BW should be defined such that the Rel-15 SSB BW can be reused and L1 changes minimized. To accomplish this, the BW of a reduced capability NR device may be defined to be equal to the size of the Type0-PDCCH Common Search Space (CSS). For NR, the size of the Type0-PDCCH CSS, which is defined as N_RB^CORESET in TS 38.213, may equal to be 24, 48 or 96 RBs. To minimize the BW of a reduced capability NR device, while at the same time minimizing the L1 changes, the BW of a reduced capability NR device may be defined to be equal to the minimum value of N_RB^CORESET, which is 24 RBs if a backward compatibility to the legacy NR CORSET designed is assumed. The NR design is highly flexible and can be configured such that the BW used for SI and Paging transmissions is supported by reduced capability NR devices; e.g., less than or equal to 24 RBs. However, this is too restrictive, since it requires legacy devices, which are capable of operating using a much wider BW, to also use a BW of 24 RBs or less for reception of SI and Paging transmissions. Taking into account deployment scenarios and use cases, legacy NR UEs and reduced capability UEs may co-exist under the same cell or the same frequency layer. Therefore, there is a need for a mechanism that allows reduced capability NR devices to monitor/receive SI and Paging using a narrow BW, without constraining the BW used for SI monitoring and reception for regular NR devices.

Disclosed herein are methods, systems, and devices that may assist with SI Acquisition and Paging for reduced capability NR devices. In an example, a method is provided for a reduced capability NR device to acquire SI transmitted by a cell, where an RRC message included of one or more BW reduced SIBs (e.g., SIB1-BR, SIB2-BR, etc.) is received by the device using an SI narrow band. The proposed solutions include mechanisms to enable repetition-based coverage enhancements, where the physical channels (e.g., PDCCH, PDSCH) used to carry the RRC message are repeated; and frequency hopping between SI narrow bands is performed to increase the robustness of the transmission to flat fading. The proposed solutions also consider alternatives where dynamic and semi-static scheduling mechanisms are used to schedule the PDSCH carrying the RRC message used to signal the BW reduced SIBs; and alternatives where an on-demand request is used to request transmission of a BR SI Message.

In another example, a method is provided for a reduced capability NR device to be paged, where a Paging Narrow band (PNB) is used by the device to monitor for and receive paging. The method may include mechanisms to enable repetition-based coverage enhancements, where repetitions of the physical channels (e.g., PDCCH and PDSCH) used to carry the Paging DCI and Paging Message are combined by the device; and frequency hopping between narrow bands is performed to increase the robustness of the transmissions to flat fading.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 4 illustrates a table showing MTC narrowbands.

FIG. 7 illustrates a table showing the schedulingInfo-SIB1-BR field in the MIB.

FIG. 8 illustrates a table showing: DCI Format 6-2 for Paging and Direct Indication.

FIG. 9 illustrates direct indication information using P-RNTI.

FIG. 11 illustrates a schedulingInfo IE Used to Configure SI-NB.

FIG. 12 illustrates an alternative SchedulingInfo IE used to configure SI-NB.

FIG. 14 illustrates a schedulingInfo IE used to configure SI-NB corresponding to a BWP.

FIG. 15 illustrates an exemplary system information indicator field design to distinguish between BR SI and Legacy SI.

FIG. 16 illustrates an RRCSystemInfoRequest Used for On Demand Request of a BR SI Message.

FIG. 23 illustrates SchedulingInfo IE used for semi-static scheduling of a PDSCH carrying an SI message

FIG. 30 illustrates a SchedulingInfo IE Used for Configuring Frequency Hopping Parameters.

FIG. 34 illustrates a Frequency Hopping for Paging Message Transmission (N=1, X=4, HoppingOffset=1, HoppingInterval=1, NumHoppingNBs=4).

FIG. 35 illustrates PCCH-Config IE used for configuring frequency hopping parameters.

DETAILED DESCRIPTION

Figure 1A:
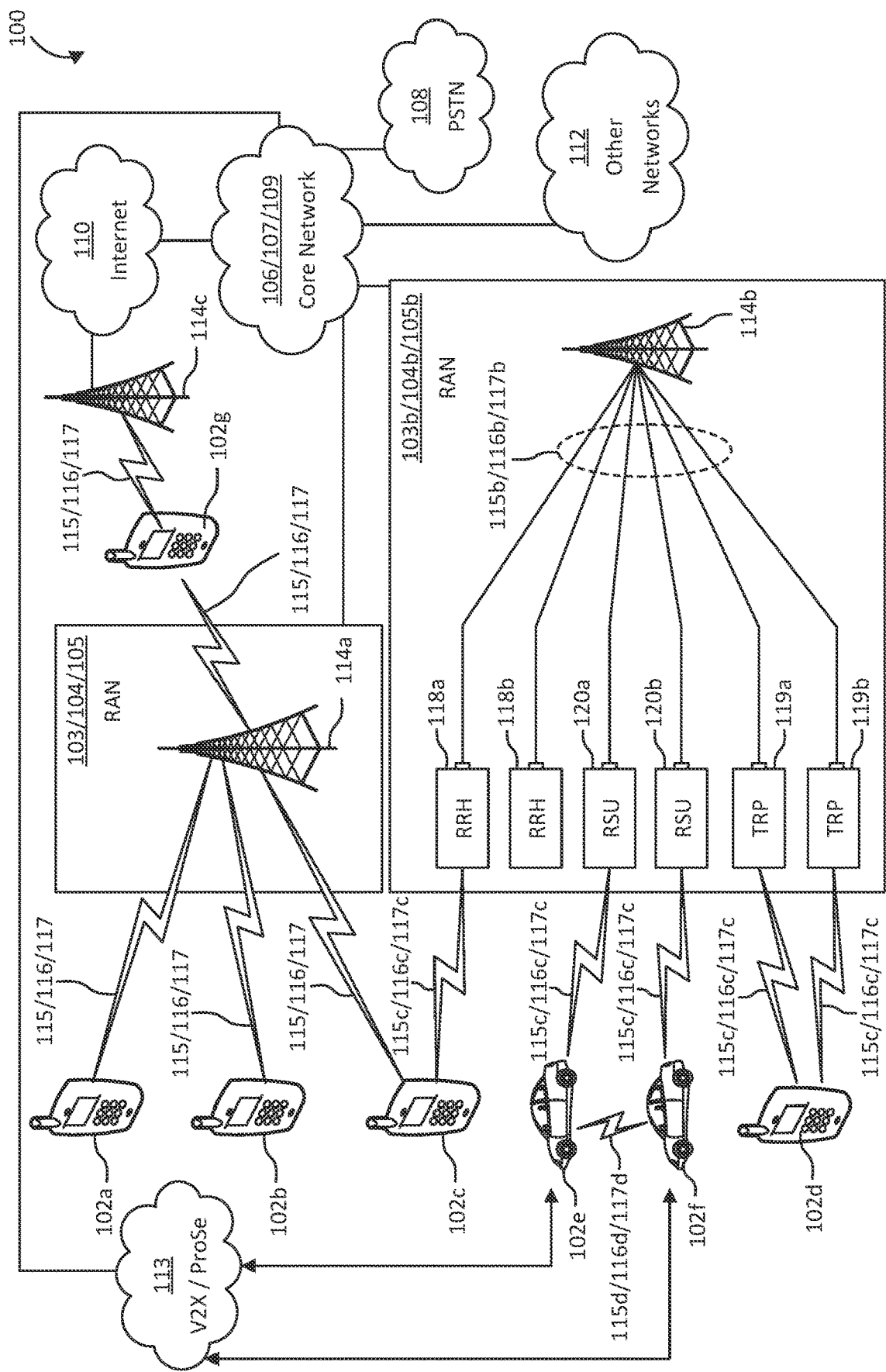
FIG. 1A illustrates an example communications system in which the methods and apparatuses described and claimed herein may be embodied.

Table 1 Describes Some of the Abbreviations Used Herein.

TABLE 1

| Abbreviations | |
|---|---|
| BCH | Broadcast Channel |
| BR-P-RNTI | Bandwidth Reduced Paging Radio Network Temporary Identifier |
| BW | Bandwidth |
| BWP | Bandwidth Part |
| BR | Bandwidth Reduced |
| CMAS | Commercial Mobile Alert Service |
| CN | Core Network |
| CORESET | Control Resource Set |
| CRC | Cyclical Redundancy Check |
| CSS | Common Search Space |
| DCI | Downlink Control Information |
| DL | Downlink |
| DL-SCH | DL Shared Channel |
| DRX | Discontinuous Reception |
| eMBB | Enhanced Mobile Broadband |
| ETWS | Earthquake & Tsunami Warning System |
| eURLLC | Enhanced Ultra-Reliable and Low Latency Communication |
| E-UTRA | Evolved Universal Terrestrial Radio Access |
| FDD | Frequency Division Duplex |
| FR1 | Frequency 1 |
| FR2 | Frequency 2 |
| gNB | NR NodeB |
| GPS | Global Positioning System |
| IMT | International Mobile Telecommunications |
| IWSN | Industrial Wireless Sensor Networks |
| LOS | Line of Sight |
| LTE | Long Term Evolution |
| MCS | Modulation and Coding Scheme |
| MHz | Mega-Hertz |
| MIB | Master Information Block |
| MO | Monitoring Occasion |
| MPDCCH | MTC Physical Downlink Control Channel |
| MTC | Machine Type Communication |
| NAS | Non-Access Stratum |
| NB | Narrowband |
| NB-IoT | Narrowband Internet of Things |
| NPDCCH | Narrowband Physical Downlink Control Channel |
| NR | New Radio |
| NW | Network |
| IE | Information Element |
| IMSI | International Mobile Subscriber Identity |
| OAM | Operations, Administration and Maintenance |
| OFDM | Orthogonal Frequency Division Multiplexing |
| PBCH | Physical Broadcast Channel |
| PCCH | Paging Common Control Channel |
| PDCCH | Physical Downlink Control Channel |
| PDSCH | Physical Downlink Shared Channel |
| PF | Paging Frame |
| PNB | Paging Narrowband |
| PO | Paging Occasion |
| PRACH | Physical Random Access Channel |
| PRB | Physical Resource Block |
| P-RNTI | Paging Radio Network Temporary Identifier |
| PTW | Paging Transmission Window |
| QPSK | Quadrature Phase Shift Keying |
| RACH | Random Access Channel |
| RAN | Radio Access Network |
| RAT | Radio Access Technology |
| RB | Resource Block |
| RMSI | Remaining Minimum System Information |
| RO | Receiving Occasion |
| RRC | Radio Resource Control |
| RV | Redundancy Version |
| RX | Receive |
| SCS | Sub-Carrier Spacing |
| SFN | System Frame Number |
| SI | System Information |
| SID | Study Item Description |
| SI-NB | System Information Narrowband |
| SI-RNTI | System Information Radio Network Temporary Identifier |
| SI-BR-RNTI | System Information Bandwidth Reduced Radio Network Temporary Identifier |
| SIB | System Information Block |
| SSB | Synchronization Signal Block |
| S-TMSI | Shortened-Temporary Mobile Subscriber Identity |
| TB | Transport Block |
| TBS | Transport Block Size |
| TDD | Time Division Duplex |
| TSC | Time Sensitive Communication |
| TSN | Time-Sensitive Networking |

TABLE 1-continued

Abbreviations

| | |
|---|---|
| UE | User Equipment |
| UL | Uplink |
| URLLC | Ultra-Reliable and Low Latency Communication |
| UTC | Coordinated Universal Time |
| VRB | Virtual Resource Block |

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHZ, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHZ, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 1A-1E as a hand-held wireless communications apparatus, it is understood that with the wide variety of use cases contemplated for 5G wireless communications, each WTRU may include or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114*b* may be part of the RAN 103*b*/104*b*/105*b*, which may also include other base stations and/or network elements (not shown), such as a base station controller (BSC), a radio network controller (RNC), relay nodes, etc. The base station 114*a* may be configured to transmit and/or receive wireless signals within a particular geographic region, which may be referred to as a cell (not shown). The base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, in an embodiment, the base station 114*a* may include three transceivers, e.g., one for each sector of the cell. In an embodiment, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, and/or RSUs 120*a* and 120*b*, over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*, 102*d*, 102*e*, 102*f*, and/or 102*g* may communicate with one another over an air interface 115*d*/116*d*/117*d* (not shown in the figures), which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b*, TRPs 119*a*, 119*b*, and/or RSUs 120*a*, 120*b*, in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc). The 3GPP NR technology includes NR V2X technologies and interface (such as Sidelink communications and etc).

In an embodiment, the base station 114*a* in the RAN 103/104/105 and the WTRUs 102*a*, 102*b*, 102*c*, or RRHs 118*a*, 118*b*, TRPs 119*a*, 119*b* and/or RSUs 120*a*, 120*b*, in the RAN 103*b*/104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114*c* and the WTRUs 102*e*, may implement a radio technology such as IEEE 802.11 to establish a wireless local area network (WLAN). In an embodiment, the base station 114*c* and the WTRUs 102*d*, may implement a radio technology such as IEEE 802.15 to establish a wireless personal area network (WPAN). In yet another embodiment, the base station 114*c* and the WTRUs 102*e*, may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VOIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
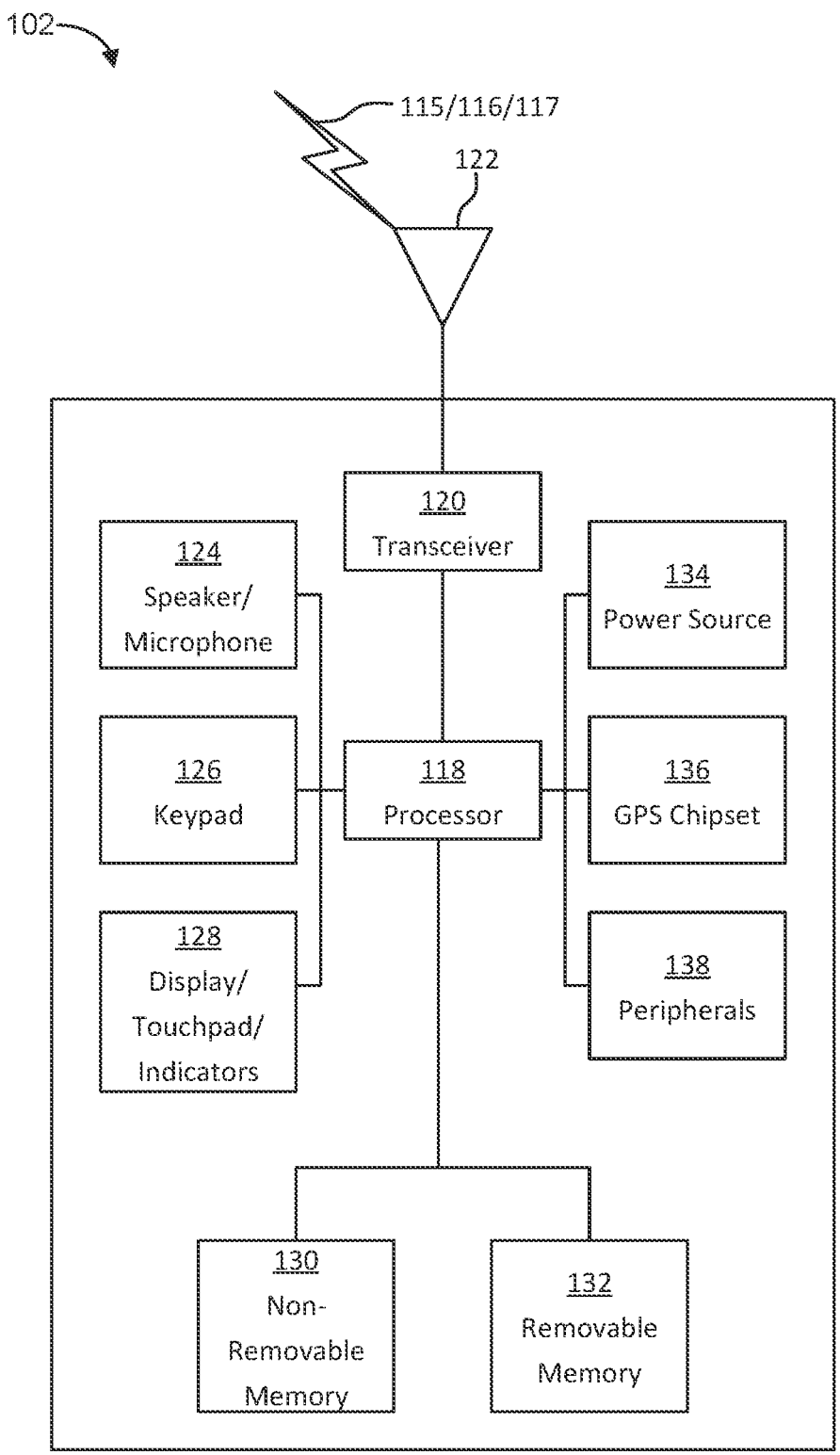
FIG. 1B illustrates a block diagram of an example apparatus or device configured for wireless communications.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may include one of the peripherals 138.

Figure 1C:
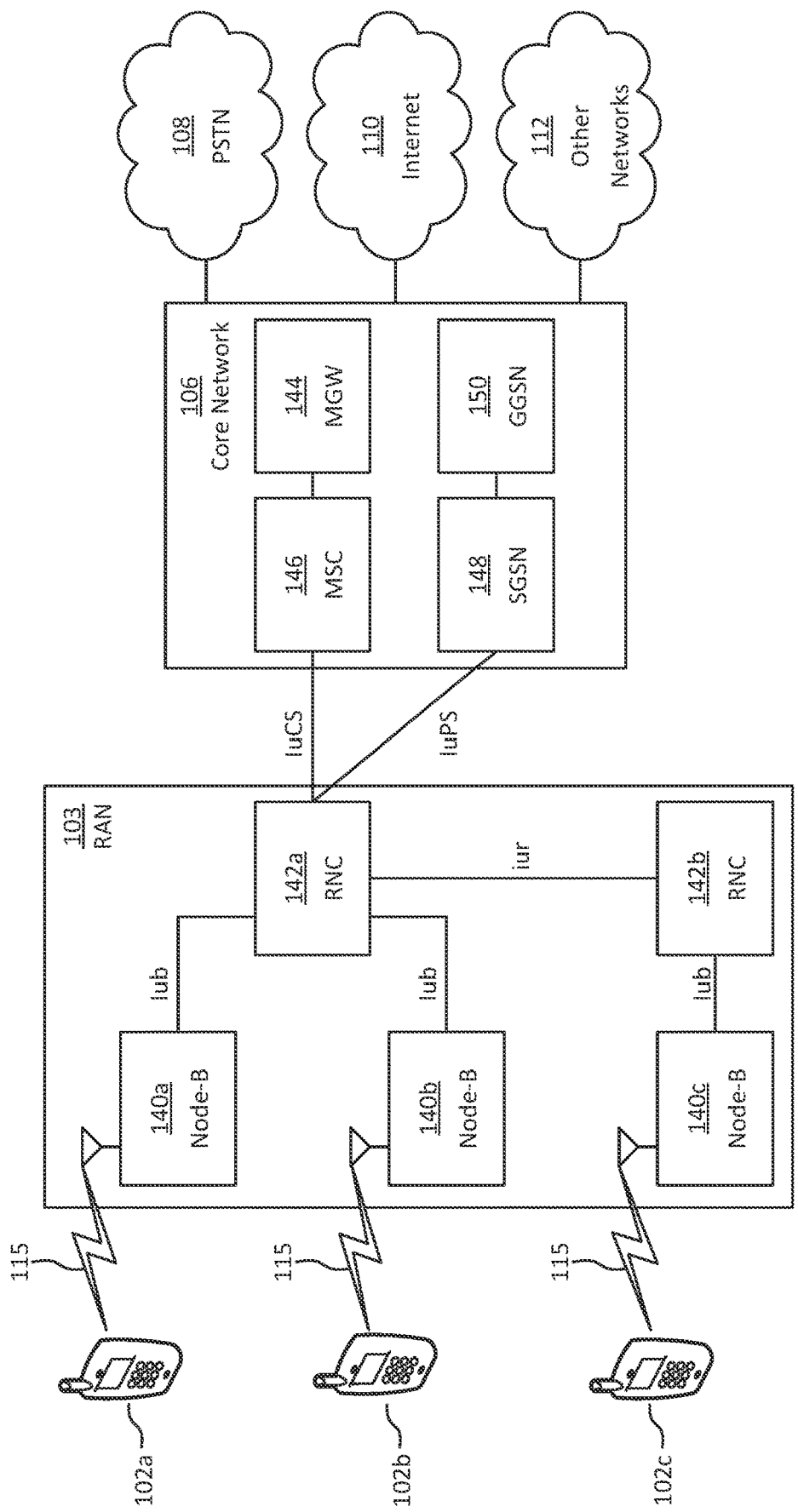
FIG. 1C illustrates a system diagram of an example radio access network (RAN) and core network.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
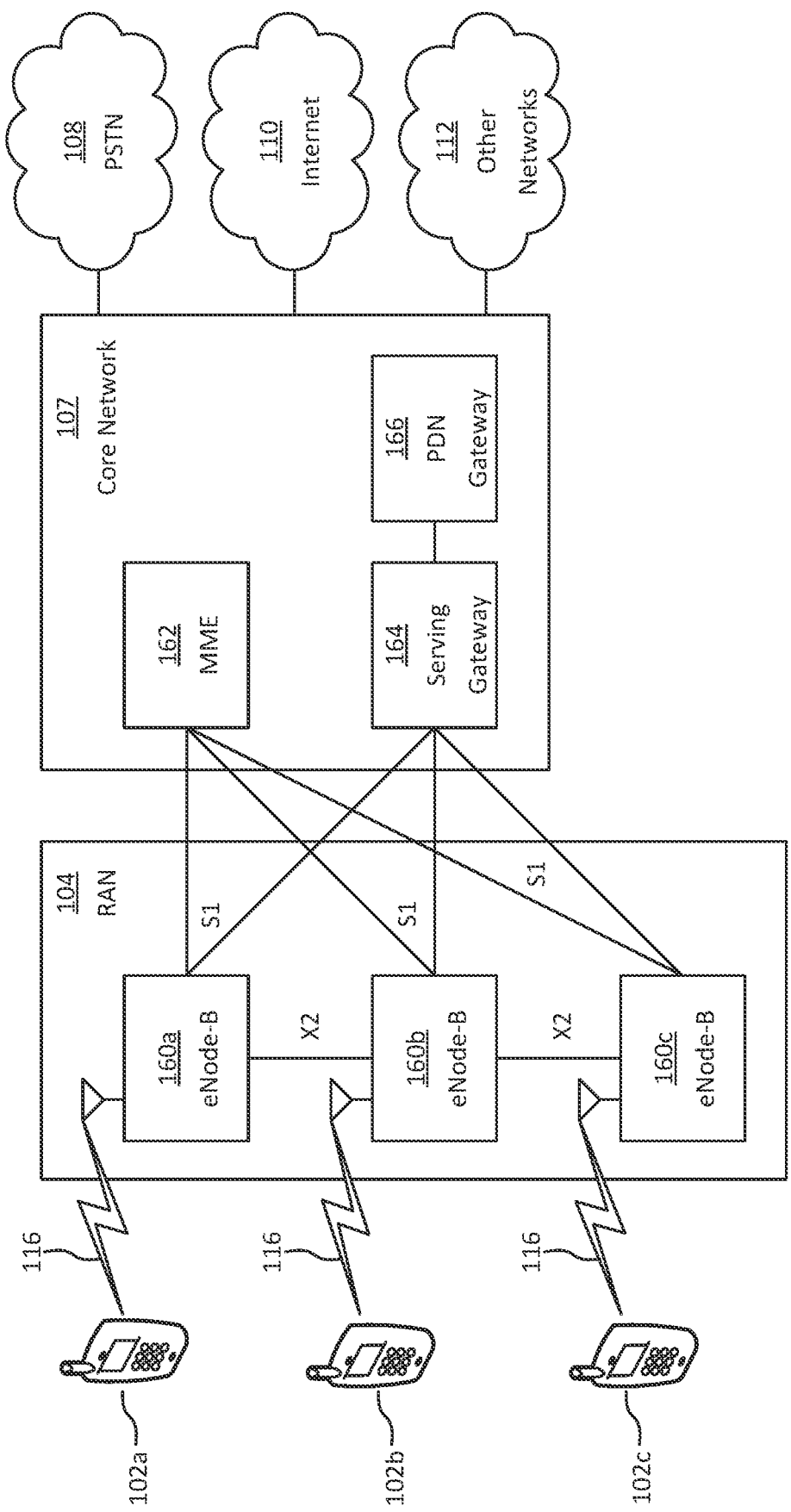
FIG. 1D illustrates a system diagram of another example RAN and core network.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an SI interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the SI interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
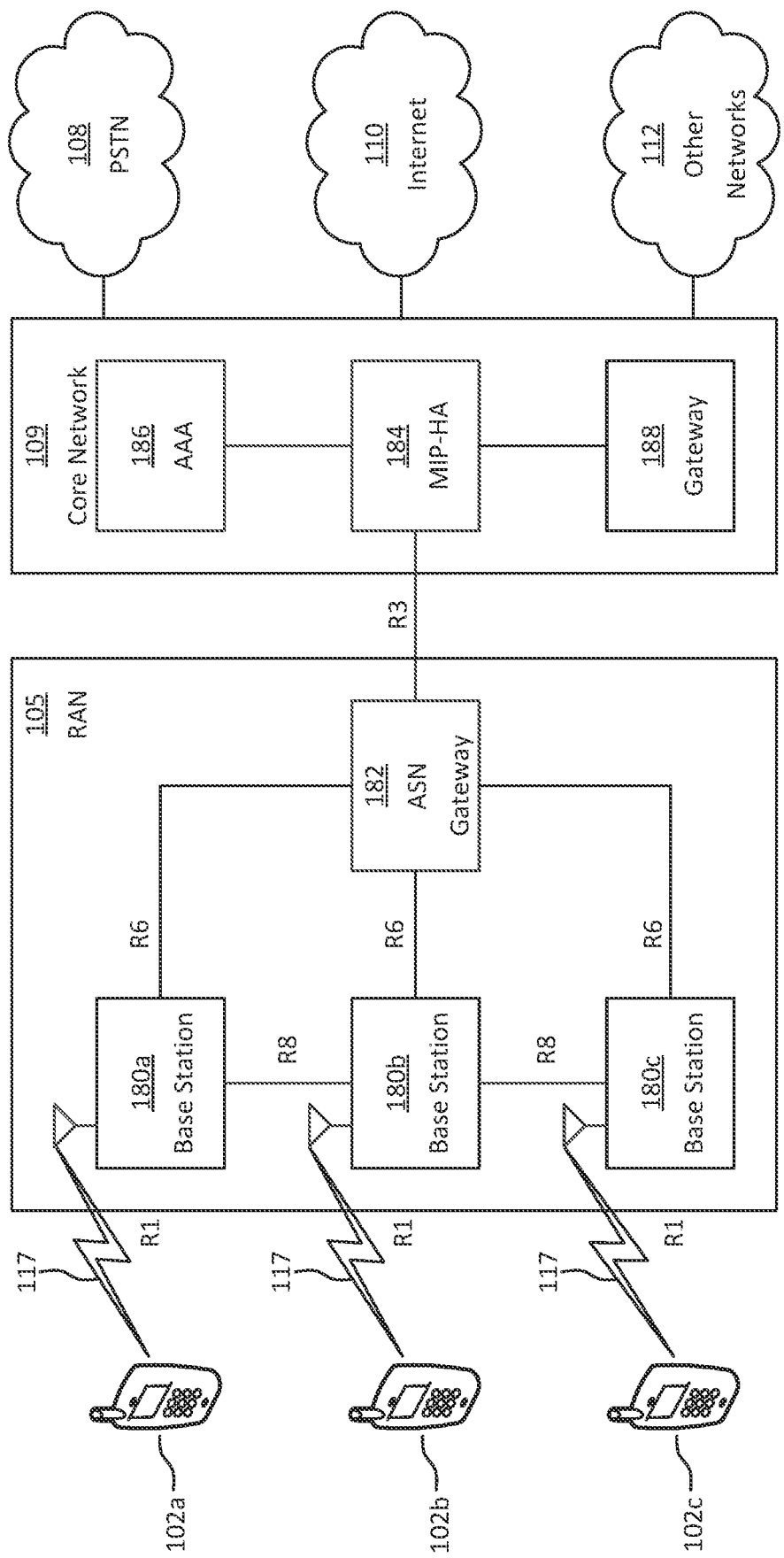
FIG. 1E illustrates a system diagram of another example RAN and core network.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QOS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
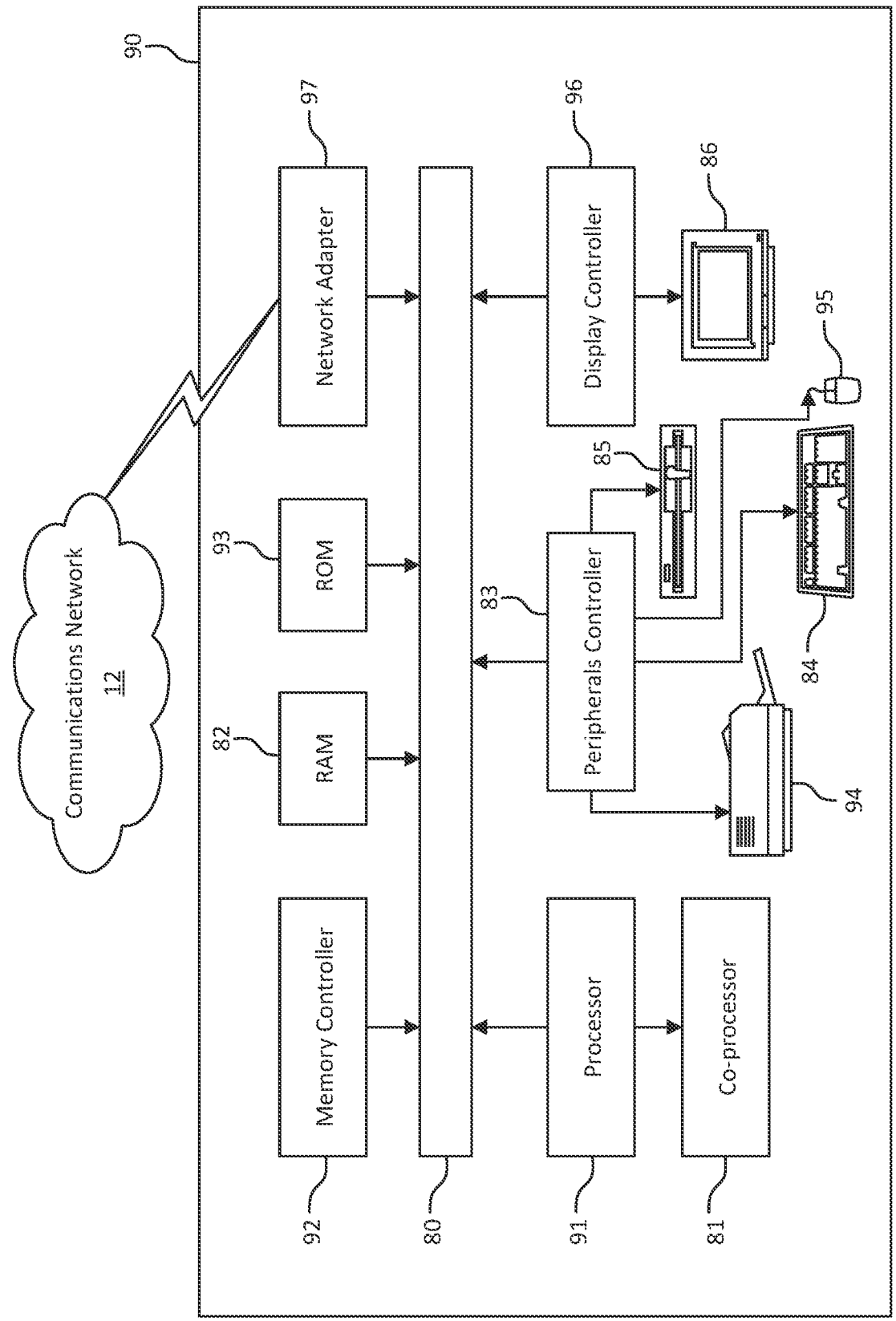
FIG. 1F illustrates a block diagram of an example computing system.

FIG. 1F is a block diagram of an exemplary computing system 90 in which one or more apparatuses of the communications networks illustrated in FIGS. IA, 1C, 1D and 1E may be embodied, such as certain nodes or functional entities in the RAN 103/104/105, Core Network 106/107/109, PSTN 108, Internet 110, or Other Networks 112. Computing system 90 may include a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 1G:
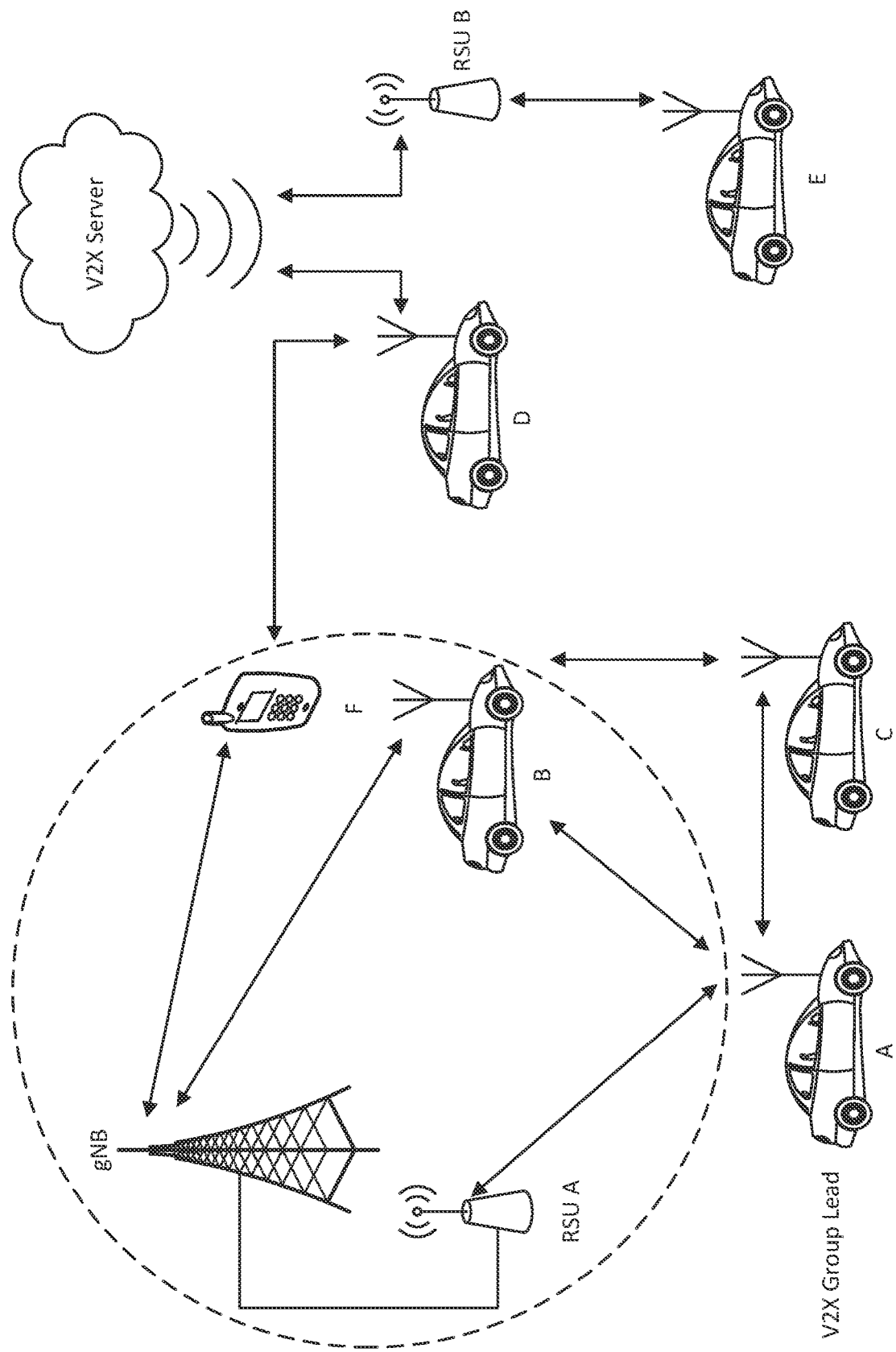
FIG. 1G illustrates a block diagram of another example communications system.

FIG. 1G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

Compared with regular NR user equipment (UEs), reduced capability NR devices are expected to have limited capabilities such as reduced processing power, smaller number of antennas, limited battery capability but yet longer battery life for some use cases, or the support of narrower bandwidth, e.g., 24 physical resource block (PRB) which is 5 or 10 MHz for subcarrier spacing of 15 or 30 kHz, respectively. Therefore, the coverage of downlink and uplink channels are expected severely deteriorated. The following procedures may be affected as follows.

Downlink Control Information for NR

According to some aspects, the following information may be transmitted by means of the DCI format 1_0 with CRC scrambled by P-RNTI:

Short Messages Indicator—2 bits according to Table 7.3.1.2.1-1 TS 38.212.
Short Messages—8 bits, according to Clause 6.5 of TS 38.331. If only the scheduling information for Paging is carried, this bit field is reserved.
Frequency domain resource assignment—$\lceil \log_2 (N_{RB}^{DL, BWP} (N_{RB}^{DL, BWP} + 1)/2) \rceil$ bits, where $N_{RB}^{DL, BWP}$ is the size of CORESET 0. If only the short message is carried, this bit field is reserved.
$N_{RB}^{DL, BWP}$ is the size of CORESET 0

-continued

Time domain resource assignment—4 bits as defined in Clause 5.1.2.1 of TS 38.214. If only the short message is carried, this bit field is reserved.
VRB-to-PRB mapping—1 bit according to Table 7.3.1.2.2-5 TS 38.212. If only the short message is carried, this bit field is reserved.
Modulation and coding scheme - 5 bits as defined in Clause 5.1.3 of TS 38.331, using Table 5.1.3.1-1. If only the short message is carried, this bit field is reserved.
TB scaling—2 bits as defined in Clause 5.1.3.2 of TS 38.214. If only the short message is carried, this bit field is reserved.
Reserved bits—8 bits for operation in a cell with shared spectrum channel access; otherwise 6 bits.

According to some aspects, the following information may be transmitted by means of the DCI format 1_0 with CRC scrambled by SI-RNTI:

Frequency domain resource assignment—$\lceil \log_2 (N_{RB}^{DL, BWP} (N_{RB}^{DL, BWP} + 1)/2) \rceil$ bits, where $N_{RB}^{DL, BWP}$ is the size of CORESET 0.
Time domain resource assignment—4 bits as defined in Clause 5.1.2.1 of TS 38.214.
VRB-to-PRB mapping—1 bit according to Table 7.3.1.2.2-5 TS 38.212.
Modulation and coding scheme - 5 bits as defined in Clause 5.1.3 of TS 38.214 [2], using Table 5.1.3.1-1.
Redundancy version—2 bits as defined in Table 7.3.1.1.1-2 TS 38.212.
System information indicator—1 bit as defined in Table 7.3.1.2.1-2 TS 38.212.
Reserved bits—17 bits for operation in a cell with shared spectrum channel access; otherwise 15 bits.

According to some aspects, System Information (SI) consists of a Master Information Block (MIB) and a number of System Information Blocks (SIBs), which may be divided into Minimum SI and Other SI.

Minimum SI may include basic information required for initial access and information for acquiring any other SI. Minimum SI consists of MIB and SIB1.

MIB contains cell barred status information and essential physical layer information of the cell required to receive further system information, e.g., CORESET #0 configuration. MIB is periodically broadcast on BCH.

SIB1 defines the scheduling of other system information blocks and contains information required for initial access. SIB1 is also referred to as Remaining Minimum SI (RMSI) and is periodically broadcast on DL-SCH or sent in a dedicated manner on DL-SCH to UEs in RRC_CONNECTED.

Other SI may encompass all SIBs not broadcast in the Minimum SI. Those SIBs can either be periodically broadcast on DL-SCH, broadcast on-demand on DL-SCH (e.g., upon request from UEs in RRC_IDLE or RRC_INACTIVE) or sent in a dedicated manner on DL-SCH to UEs in RRC_CONNECTED. Another SI may consist of SIB2, SIB3, SIB4, SIB5, SIB6, SIB7, SIB8, and SIB9.

SIB2 may contain cell re-selection information, mainly related to the serving cell;
SIB3 may contain information about the serving frequency and intra-frequency neighboring cells relevant for cell re-selection (including cell re-selection parameters common for a frequency as well as cell specific re-selection parameters);
SIB4 may contain information about other NR frequencies and inter-frequency neighboring cells relevant for cell re-selection (including cell re-selection parameters common for a frequency as well as cell specific re-selection parameters);
SIB5 may contain information about E-UTRA frequencies and E-UTRA neighboring cells relevant for cell re-selection (including cell re-selection parameters common for a frequency as well as cell specific re-selection parameters);
SIB6 may contain an ETWS primary notification;
SIB7 may contain an ETWS secondary notification;
SIB8 may contain a CMAS warning notification;
SIB9 may contain information related to GPS time and Coordinated Universal Time (UTC).

Figure 2:
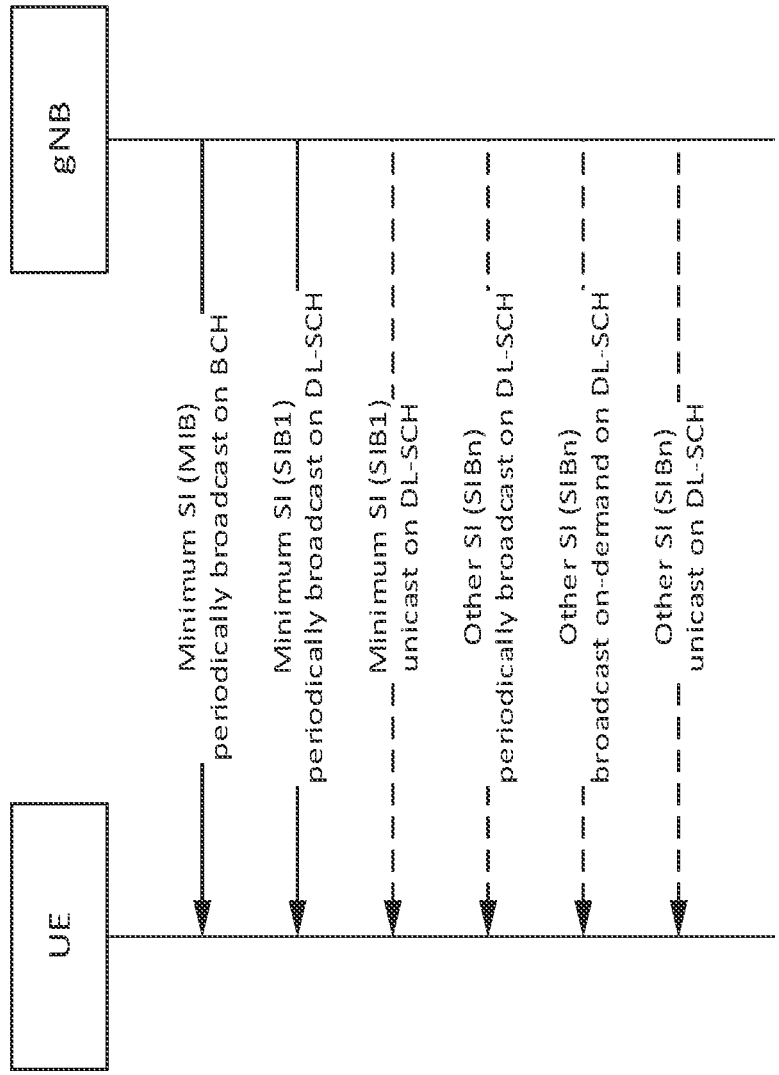
FIG. 2 illustrates System Information provisioning in NR.

According to some aspects, FIG. 2 summarizes System Information provisioning in NR.

According to some aspects, paging may allow the network to reach UEs in RRC_IDLE and in RRC_INACTIVE state through Paging messages, and to notify UEs in RRC_IDLE, RRC_INACTIVE and RRC_CONNECTED state of system information change and ETWS/CMAS indications through Short Messages. Both Paging messages and Short Messages are addressed with P-RNTI on PDCCH, but while the former is sent on PCCH, the latter is sent over PDCCH directly.

According to some aspects, the UE may use Discontinuous Reception (DRX) in RRC_IDLE and RRC_INACTIVE state in order to reduce power consumption. The UE may monitor one Paging Occasion (PO) per DRX cycle. A PO is a set of PDCCH monitoring occasions and may consist of multiple time slots (e.g., subframe or OFDM symbol) where paging DCI can be sent TS 38.213. One Paging Frame (PF) is one Radio Frame and may contain one or multiple PO(s) or starting point of a PO.

In multi-beam operations, the UE may assume that the same paging message and the same Short Message are repeated in all transmitted beams and thus the selection of the beam(s) for the reception of the paging message and Short Message is up to UE implementation. The paging message may be the same for both RAN initiated paging and CN initiated paging.

According to some aspects, the UE may initiate an RRC Connection Resume procedure upon receiving RAN initiated paging. If the UE receives a CN initiated paging in RRC_INACTIVE state, the UE may move to RRC_IDLE and informs NAS.

According to some aspects, the PF and PO for paging may be determined by the following formulae: SFN for the PF may be determined by (SFN+PF_offset) mod T=(T div N)*(UE_ID mod N); and Index (i_s), indicating the index of the PO, may be determined by i_s=floor (UE_ID/N) mod Ns.

According to some aspects, the PDCCH monitoring occasions for paging are determined according to pagingSearchSpace as specified in TS 38.213 [5] and firstPDCCH-MonitoringOccasionOfPO if configured as specified in TS 38.331. When SearchSpaceId=0 is configured for pagingSearchSpace, the PDCCH monitoring occasions for paging are same as for RMSI as defined in clause 13 in TS 38.213.

According to some aspects, when SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

According to some aspects, when SearchSpaceId other than 0 is configured for pagingSearchSpace, the UE monitors the $(i\_s+1)^{th}$ PO. A PO is a set of 'S*X' consecutive PDCCH monitoring occasions where 'S' is the number of actual transmitted SSBs determined according to ssb-PositionsInBurst in SIB1 and X is the nrofPDCCH-MonitoringOccasionPerSSB-InPO if configured or is equal to 1 otherwise. The $[x*S+K]^{th}$ PDCCH monitoring occasion for paging in the PO corresponds to the $K^{th}$ transmitted SSB, where x=0.1 . . . , X−1, K=1, 2, . . . , S. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of (i_s+1)th PO is the (i_s+1)th value of the firstPDCCH-MonitoringOccasionOfPO parameter; otherwise, it is equal to i_s*S*X. If X>1, when the UE detects a PDCCH transmission addressed to P-RNTI within its PO, the UE is not required to monitor the subsequent PDCCH monitoring occasions for this PO.

According to some aspects, a PO associated with a PF may start in the PF or after the PF.

According to some aspects, the PDCCH monitoring occasions for a PO can span multiple radio frames. When SearchSpaceId other than 0 is configured for pagingSearchSpace the PDCCH monitoring occasions for a PO can span multiple periods of the paging search space.

According to some aspects, the following parameters may be used for the calculation of PF and i_s: T-DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied); N-number of total paging frames in T; Ns-number of paging occasions for a PF; PF_offset-offset used for PF determination; and UE_ID-5G-S-TMSI mod 1024.

According to some aspects, parameters Ns, nAndPagingFrameOffset, nrofPDCCH-MonitoringOccasionPerSSB-InPO, and the length of default DRX Cycle are signaled in SIB1. According to some aspects, the values of N and PF_offset are derived from the parameter nAndPagingFrameOffset as defined in TS 38.331 [2]. The parameter first-PDCCH-MonitoringOccasionOfPO may be signalled in SIB1 for paging in initial DL BWP. For paging in a DL BWP other than the initial DL BWP, the parameter first-PDCCH-MonitoringOccasionOfPO may be signaled in the corresponding BWP configuration.

According to some aspects, if the UE has no 5G-S-TMSI, for instance when the UE has not yet registered onto the network, the UE may use as default identity UE_ID=0 in the PF and i_s formulas above.

According to some aspects, 5G-S-TMSI is a 48 bit long bit string as defined in TS 23.501. 5G-S-TMSI may in the formulae above be interpreted as a binary number where the left most bit represents the most significant bit.

Figure 3:
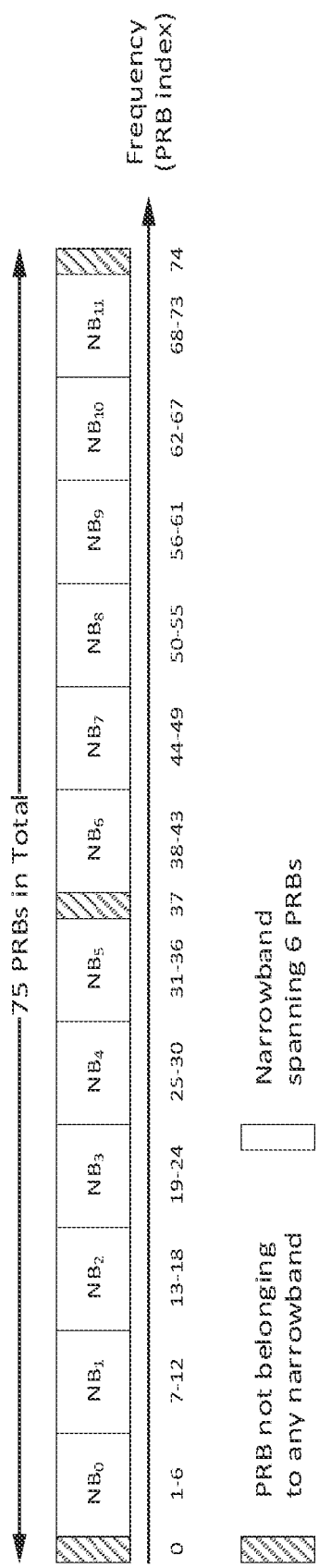
FIG. 3 illustrates a narrowband definition for MTC.

According to some aspects, the concept of narrow bands, as shown in FIG. 3 and introduced in Rel-13, may allow MTC devices to access a more wideband LTE carrier. The number of MTC narrow bands may be dependent on the system BW as shown by the table shown in FIG. 4.

Figure 5:
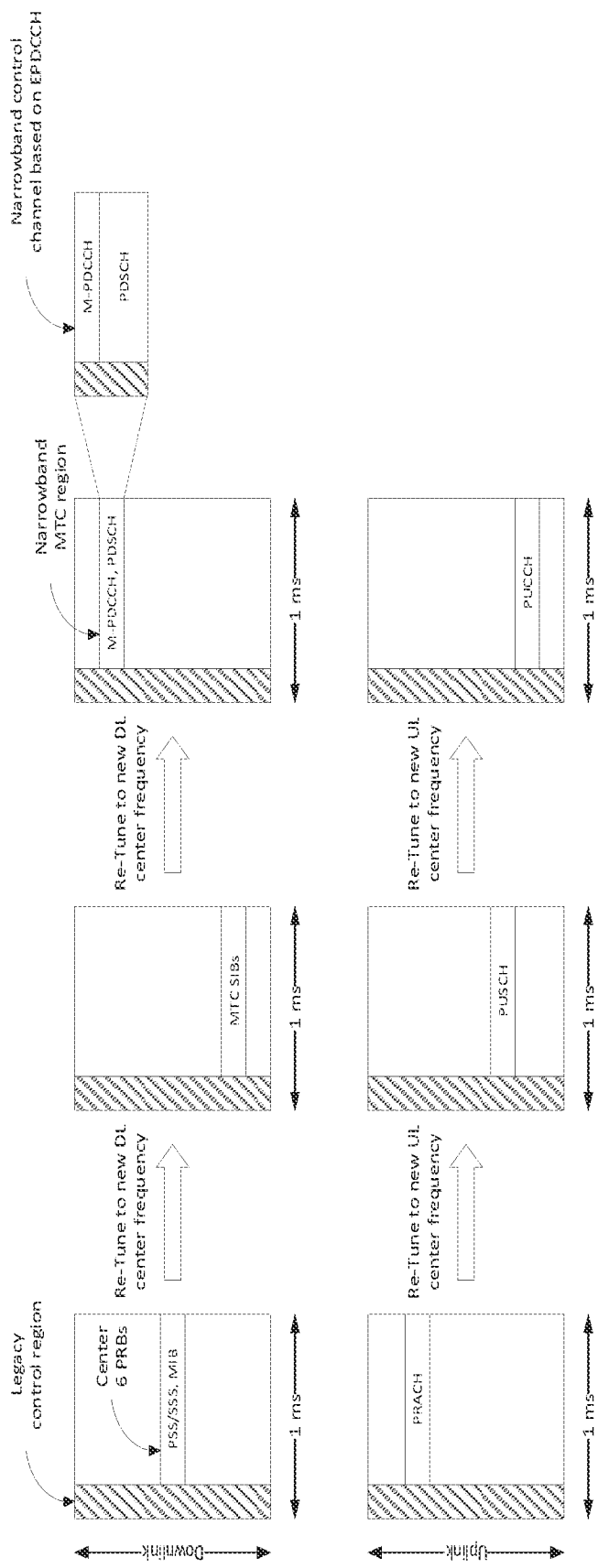
FIG. 5 illustrates narrowband operation for MTC.

According to some aspects, at a given time instant, MTC devices can only transmit or receive over a bandwidth corresponding to a single narrow band. MTC devices can switch narrow bands between subframes as shown in FIG. 5. Receiver retuning between downlink subframes is assumed to take place during the control region at the start of the subframe. The time for transmitter retuning between uplink subframes is made available by not transmitting the last symbol(s) just before retuning and/or the first symbols(s) just after retuning.

System Information for MTC

According to some aspects, System Information is broadcast to MTC devices using Bandwidth Reduced (BR) instances of the SIBs that are inherited from LTE. Although the SIB definitions from LTE are reused, the SI is broadcast separately from ordinary LTE devices. This is because the SI transmissions in LTE are scheduled using LTE's PDCCH and may be scheduled to use any number of PRBs for PDSCH. This means SI transmission may occupy too large a bandwidth to be received by MTC devices.

Figure 6:
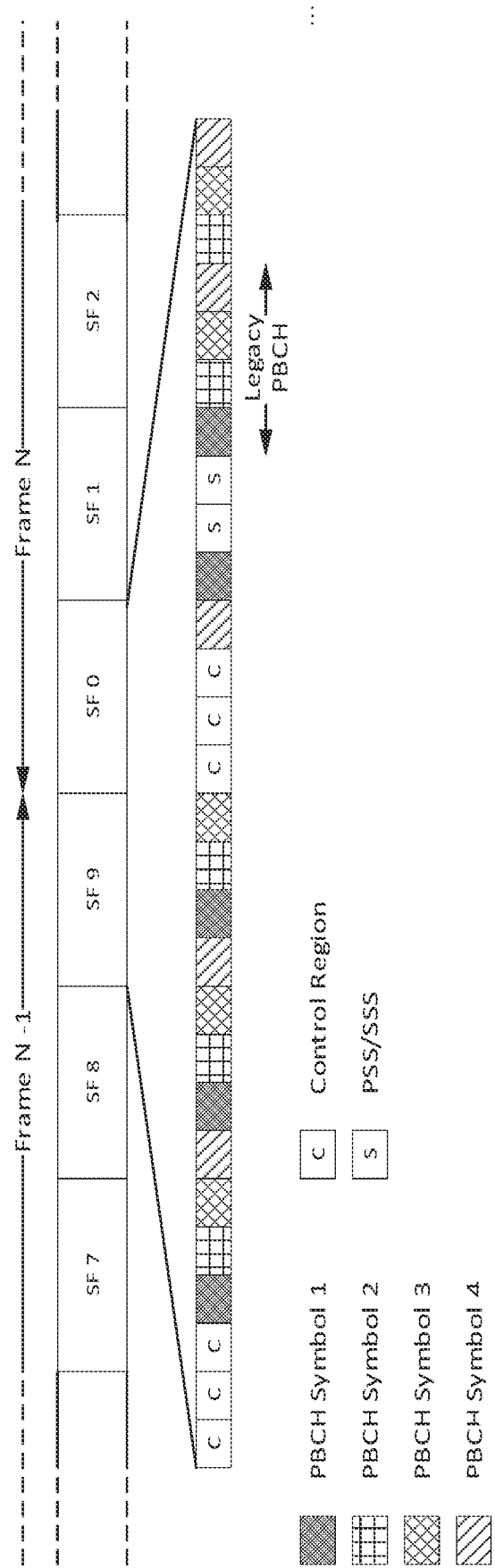
FIG. 6 illustrates PBCH repetition for MTC.

According to some aspects, MTC devices may use the legacy PBCH since it is completely contained within the center 1.4 MHz regardless of the system bandwidth. To extend coverage, the PBCH is repeated by a factor of 5. For FDD, the four OFDM symbols of subframe 0) are repeated in five additional symbols in subframe 0 and eleven symbols in subframe 9 of the preceding frame as shown in FIG. 6. For TDD, PBCH is likewise transmitted in subframes 0 and 5. If the five times repetition does not provide sufficient coverage, additional power boosting can be used to further extend the coverage of the PBCH.

According to some aspects, a new SIB1 (SIB1-BR) is introduced for MTC since the legacy SIB1 may have a BW exceeding six RBs and consist of up to 2216 bits. Scheduling info for SIB1-BR is signaled using the schedulingInfoSIB1-BR field in the MIB. The bits of this field are interpreted according to FIG. 7. SIB1-BR is transmitted on PDSCH with QPSK modulation using all 6 PRBs in a narrow band and Redundancy Version (RV) cycling across the repetitions. SIB1-BR includes scheduling information for the remaining SIBs relevant for MTC devices.

According to some aspects, for MTC, zSIBs other than SIB1-BR are carried in SI messages, where each SI message can contain one or more SIBs. Each SI message is configured with an SI periodicity, a Transport Block Size (TBS) and a starting narrow band. The SI messages are periodically broadcasted during specific, periodic, and nonoverlapping time domain windows known as SI windows of configurable length.

According to some aspects, SI messages can be repeated within their respective SI windows. Possible repetition patterns are every frame, every 2nd frame, every 4th frame, and every $8^{th}$ frame. All SI messages may have the same repetition pattern.

According to some aspects, each SI message is transmitted on PDSCH with QPSK modulation using all 6 PRBs in its narrow band and RV cycling across the repetitions. The detailed time/frequency domain scheduling information for the SI messages may be provided in SIB1-BR, rather than being scheduled dynamically via a corresponding PDCCH, as in the case for regular LTE devices.

According to some aspects, frequency hopping for SI messages and paging messages may be activated by a common activation bit si-HoppingConfigCommon in SIB1-BR.

According to some aspects, the UE may use Discontinuous Reception (DRX) in idle mode in order to reduce power consumption. One Paging Occasion (PO) may be a subframe where there may be P-RNTI transmitted on PDCCH or MPDCCH or, for NB-IoT on NPDCCH addressing the paging message. In P-RNTI transmitted on MPDCCH case, PO refers to the starting subframe of MPDCCH repetitions. In case of P-RNTI transmitted on NPDCCH, PO refers to the starting subframe of NPDCCH repetitions unless subframe determined by PO is not a valid NB-IoT downlink subframe then the first valid NB-IoT downlink subframe after PO may be the starting subframe of the NPDCCH repetitions.

According to some aspects, one Paging Frame (PF) may be one Radio Frame, which may contain one or multiple Paging Occasion(s). When DRX is used the UE needs only to monitor one PO per DRX cycle.

According to some aspects, one Paging Narrow band (PNB) may be one narrow band, on which the UE performs the paging message reception.

According to some aspects, PF, PO, and PNB may be determined by following formulae using the DRX parameters provided in System Information. PF may be given by following equation: SFN mod T=(T div N)*(UE_ID mod N). Index i_s pointing to PO from subframe pattern defined in 7.2 may be derived from following calculation: i_s=floor (UE_ID/N) mod Ns.

According to some aspects, if P-RNTI is monitored on MPDCCH, the PNB may be determined by the following equation: PNB=floor (UE_ID/(N*Ns)) mod Nn. If P-RNTI is monitored on NPDCCH and the UE supports paging on a non-anchor carrier, and if paging configuration for non-anchor carrier is provided in system information, then the paging carrier may be determined by the paging carrier with smallest index n (0)≤n≤Nn−1) fulfilling the following equation: floor (UE_ID/(N*Ns) mod W<W(0)+W(1)+ . . . +W(n).

The following Parameters may be used for the calculation of the PF, i_s, PNB, and the NB-IoT paging carrier:
- T: DRX cycle of the UE. Except for NB-IoT, if a UE specific extended DRX value of 512 radio frames is configured by upper layers according to 7.3, T=512. Otherwise, T may be determined by the shortest of the UE specific DRX value, if allocated by upper layers, and a default DRX value broadcast in system information. If UE specific DRX is not configured by upper layers, the default value may be applied. UE specific DRX is not applicable for NB-IoT. In RRC_INACTIVE state, if extended DRX is not configured by upper layers as defined in 7.3, T may be determined by the shortest of the RAN paging cycle, the UE specific paging cycle, and the default paging cycle, if allocated by upper layers. Otherwise, in RRC_INACTIVE state when extended DRX is configured by upper layers. T may be determined by the shortest of the RAN paging cycle, the UE specific paging cycle, if allocated by upper layers and the default paging cycle during the PTW as defined in 7.3, and by the RAN paging cycle outside the PTW.
- nB: 4T, 2T. T. T/2, T/4, T/8, T/16, T/32, T/64, T/128, and T/256, and for NB-IoT also T/512, and T/1024.
- N: min(T,nB)
- Ns: max(1,nB/T)
- Nn: number of paging narrow bands (for P-RNTI monitored on MPDCCH) or paging carriers (for P-RNTI monitored on NPDCCH) determined as follows:
  If UE supports group WUS and gwus-Config-r16 is present in system information:
    this is the number of paging narrow bands (paging carriers) that support group WUS.
  else:
    this is the number of paging narrow bands (paging carriers) provided in system information.
- UE_ID:
  If the UE supports E-UTRA connected to 5GC and NAS indicated to use 5GC for the selected cell:
    5G-S-TMSI mod 1024, if P-RNTI is monitored on PDCCH.
    5G-S-TMSI mod 16384, if P-RNTI is monitored on NPDCCH or MPDCCH.
  else
    IMSI mod 1024, if P-RNTI is monitored on PDCCH.
    IMSI mod 4096, if P-RNTI is monitored on NPDCCH.
    IMSI mod 16384, if P-RNTI is monitored on MPDCCH or if P-RNTI is monitored on NPDCCH and the UE supports paging on a non-anchor carrier, and if paging configuration for non-anchor carrier is provided in system information.
- W(i): Weight for NB-IoT paging carrier i.
- W: Total weight of all NB-IoT paging carriers, e.g., W=W(0)+W(1)+ . . . +W(Nn−1).

The Paging Message may be scheduled using DCI Format 6-2, which may be defined as shown in FIG. 8.

Figure 10:
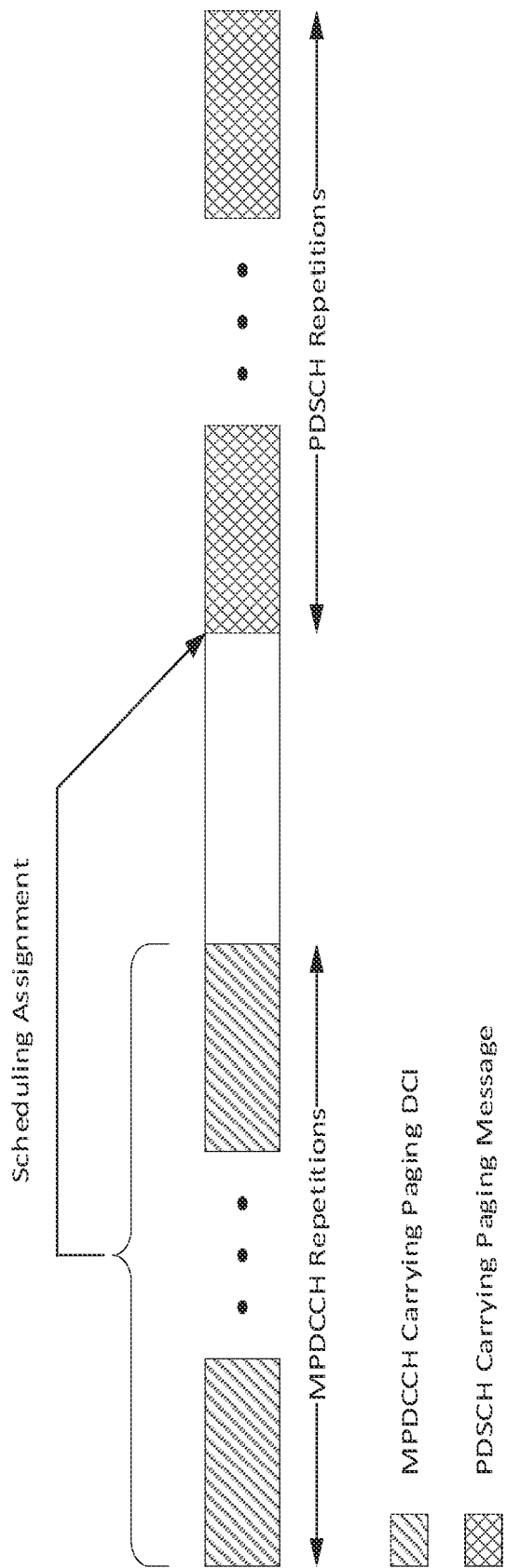
FIG. 10 illustrates paging transmission using repetition.

According to some aspects, FIG. 10 is an illustration of a Paging transmission using repetition. The PO corresponds to the starting subframe of the MPDCCH repetitions.

According to some aspects, frequency hopping for SI messages and paging messages may be activated by a common activation bit si-HoppingConfigCommon in SIB1-BR According to some aspects, the use cases identified for 5G are Enhanced Mobile Broadband (eMBB), Massive Machine-Type Communication (mMTC) and Ultra-Reliable and Low Latency Communication (URLLC). Time Sensitive Communication (TSC) may also be identified as a use case at the boundary between mMTC and URLLC.

Support for eMBB and URLLC were introduced in Release 15. URLLC was further enhanced in Release 16 with the enhanced URLLC (eURLLC) and Industrial IoT work items. Release 16 also introduced support for Time-Sensitive Networking (TSN) and 5G integration for TSC use cases. In the 3GPP study on "self-evaluation towards IMT-2020 submission" it was confirmed that NB IoT and LTE M fulfill the IMT-2020 requirements for mMTC and can be certified as 5G technologies.

According to some aspects, in Release 17, a new set of use cases with requirements at the boundary of eMBB, URLLC and mMTC is being studied. These use cases include Industrial Wireless Sensor Networks (IWSN), smart cities and wearables.

IWSN use cases and requirements are described in TR 22.804, TS 22.104, TR 22.832 and TS 22.261. Devices in such an environment include, e.g., pressure sensors, humidity sensors, thermometers, motion sensors, accelerometers, actuators, etc. Connecting these types of devices to 5G networks and core will allow connected industries to improve flexibility, enhance productivity and efficiency, reduce maintenance cost, and improve operational safety.

The smart city use case and requirements are described in TS 22.804. The smart city vertical covers data collection and processing to more efficiently monitor and control city resources, and to provide services to city residents. Surveillance cameras are expected to be an essential part of a smart city.

The wearables use case includes smart watches, rings, eHealth related devices, and medical monitoring devices etc. Devices supporting the wearables use case are expected to be small in size and may also be constrained in terms of power.

The Release 17 SID on Support of Reduced Capability NR Devices defines generic requirements for these use cases as follows:
- Device Complexity: Main motivation for the new device type is to lower the device cost and complexity as compared to high-end eMBB and URLLC devices of Rel-15/Rel-16. This is especially the case for industrial sensors.

Device Size: Requirement for most use cases is that the standard enables a device design with compact form factor.

Deployment Scenarios: System should support all FR1/FR2 bands for FDD and TDD.

The Release 17 SID on Support of Reduced Capability NR Devices defines use case specific requirements as follows:

Industrial Wireless Sensors: Communication service availability is 99.99% and end-to-end latency less than 100 ms. The reference bit rate is less than 2 Mbps (potentially asymmetric e.g., UL heavy traffic) for all use cases and the device is stationary. The battery should last at least few years. For safety related sensors, latency requirement is lower, 5-10 ms.

Video Surveillance: The reference economic video bitrate may be 2-4 Mbps, latency <500 ms, reliability 99%-99.9%. High-end video e.g., for farming may require 7.5-25 Mbps. It is noted that traffic pattern is dominated by UL transmissions.

Wearables: Reference bitrate for smart wearable application can be 10-50 Mbps in DL and minimum 5 Mbps in UL and peak bit rate of the device higher, 150 Mbps for downlink and 50 Mbps for uplink. Battery of the device should last multiple days (up to 1-2 weeks).

Problem Statements

First Problem Reduced BW

To reduce cost and complexity, reduced capability NR devices are expected to have a narrower BW compared to regular NR devices. In accordance with the SID on Support of Reduced Capability NR Devices, the BW should be defined such that the Rel-15 SSB BW can be reused and L1 changes minimized. To accomplish this, the BW of a reduced capability NR device may be defined to be equal to the size of the Type0-PDCCH Common Search Space (CSS). For NR, the size of the Type0-PDCCH CSS, which may be defined as $N\_RB^{\wedge}CORESET$ in TS 38.213 [5], may equal to be 24, 48 or 96 RBs. To minimize the BW of a reduced capability NR device, while at the same time minimizing the L1 changes, the BW of a reduced capability NR device may be defined to be equal to the minimum value of $N\_RB^{\wedge}CORESET$, which may be 24 RBs if a backward compatibility to the legacy NR CORSET designed may be assumed. The NR design is highly flexible and can be configured such that the BW used for SI and Paging transmissions is supported by reduced capability NR devices, e.g., less than or equal to 24 RBs. However, this is too restrictive, since it requires legacy devices, which are capable of operating using a much wider BW, to also use a BW of 24 RBs or less for reception of SI and Paging transmissions. Taking into account the deployment scenarios and use cases described in the background section, legacy NR UEs and reduced capability UEs may co-exists under the same cell or the same frequency layer. Therefore, there is a need for a mechanism that allows reduced capability NR devices to monitor/receive SI and Paging using a narrow BW, without constraining the BW used for SI monitoring and reception for regular NR devices.

Second Problem Reduced Coverage

Complexity reduction and cost savings techniques (e.g., single RX antenna, cheaper components) applied for reduced capability NR devices are expected to reduce the cell coverage compared to regular NR devices. As a result, reduced capability NR devices that are at the cell edge, indoors, or in areas where the Line-of-Sight (LOS) signal is blocked may not be able to acquire SI or be paged reliably. Therefore, there is a need for a mechanism that improves the coverage of the DL channels used for SI transmission and paging to ensure that a reduced capability NR device can receive SI and be paged reliably anywhere in the cell. The scenarios considered should include those where the PDCCH can be reliably decoded, but the PDSCH cannot; and those where both the PDCCH and the PDSCH cannot be reliably decoded. The techniques introduced should aim to minimize any additional signaling overhead that results and should also minimize any additional power consumption or excessive latency that may be incurred by the device.

Third Problem: Susceptibility at Fading

Reduced capability NR devices will have a narrower BW compared to regular NR devices, which makes transmission of the DL channels used for SI and paging more susceptible to flat fading. This can be more pronounced for indoor deployments, where the multipath environment is such that there are not reflections from very distant objects, thereby decreasing the delay spread. The coherence BW, which is the range of frequencies over which the channel can be considered "flat", is inversely proportional to the delay spread. As the coherence BW increases, so does the susceptibility to flat fading, since the correlated fading will impact more of the subcarriers used for the narrow band transmission. Coherence bandwidth for 5G network in indoor environments may be expected to be around 10 to 13 MHz for most of the cases. As a result, reduced capability NR devices may experience non-selective fading that prevents them from being able to acquire the SI or be paged reliably. Therefore, there is a need for a mechanism to overcome the flat fading that may occur when transmitting the DL channels used for SI and paging for reduced capability NR devices.

According to some aspects, the following solutions are provided for SI Acquisition and Paging for reduced capability NR devices.

In one aspect, methods are provided for a reduced capability NR device to acquire SI transmitted by a cell, where an RRC message included of one or more BW reduced SIBs (e.g., SIB1-BR, SIB2-BR, etc.) may be received by the device using an SI Narrow band (SI-NB). In some aspects, the proposed solutions include mechanisms to enable repetition-based coverage enhancements, where the physical channels (e.g., PDCCH, PDSCH) used to carry the RRC message are repeated; and frequency hopping between SI-NBs may be performed to increase the robustness of the transmission to flat fading. The proposed solutions also consider alternatives where dynamic and semi-static scheduling mechanisms are used to schedule the PDSCH carrying the RRC message used to signal the BW reduced SIBs; and alternatives where an on-demand request may be used to request transmission of a BR SI Message.

In one aspect, methods are provided for a reduced capability NR device to be paged, where a Paging Narrow band (PNB) may be used by the device to monitor for and receive paging. The proposed solutions include mechanisms to enable repetition-based coverage enhancements, where repetitions of the physical channels (e.g., PDCCH and PDSCH) used to carry the Paging DCI and Paging Message are combined by the device; and frequency hopping between narrow bands may be performed to increase the robustness of the transmissions to flat fading.

According to some aspects, a reduced capability NR device may acquire a BR SI message using an SI-NB, where DCI may be used to dynamically schedule the PDSCH carrying the BR SI message, when using repetition-based enhanced coverage with frequency hopping.

In one aspect, a device may be configured to execute the instructions of receiving a BR SI message configuration for reduced capability NR devices in an RRC message, where the BR SI message configuration includes an indication of a plurality of PDCCH monitoring occasions, and an indication of a first SI-NB. The instructions may further include monitoring for reception of a PDCCH addressed to SI-RNTI in the first SI-NB during the PDCCH monitoring occasions. The instructions may further include receiving a PDCCH addressed to SI-RNTI, where the PDCCH includes DCI used to dynamically schedule a PDSCH, where the DCI includes a field used to indicate a second SI-NB used to receive the PDSCH. The instructions may further include receiving the PDSCH in the second SI-NB, where the PDSCH includes a Transport Block (TB) corresponding to a BR SI message. The instructions may further include performing the assigned actions for processing the BW reduced SIB(s) received in the BR SI message.

According to some aspects, the BR SI message configuration may further include a hopping configuration. The device may determine the SI-NB of the PDCCH monitoring occasion according to the hopping configuration and the monitoring instruction may further include monitoring for reception of the PDCCH addressed to SI-RNTI in the determined SI-NB.

According to some aspects, the hopping pattern configuration may include a hopping interval indicating when the hops should take place in the time domain and a hopping offset indicating how large the hops should be in the frequency domain.

According to some aspects, the SI-NBs in the hopping pattern configuration may correspond to a narrow band BWP.

According to some aspects, the hopping interval configuration may correspond to performing frequency hopping at the start of each sweep of a BR SI message occurring in the BR SI window.

According to some aspects, the RRC message is a SIB1-BR message.

According to some aspects, the SIB1-BR message is received in the initial DL BWP and the SI-NB of the SI message corresponds to a DL BWP that is different than the initial DL BWP.

According to some aspects, the SIB1-BR message is received in a DL BWP that is different than the initial DL BWP.

According to some aspects, the MIB indicates the DL BWP to use for reception of the SIB1-BR message.

According to some aspects, SIB1-BR indicates the DL BWP to use for reception of the SI message.

According to some aspects, the DCI further includes a field to indicate if the SI is for a legacy device or a reduced capability NR device.

According to some aspects, the RRC messages include a configuration for a plurality of BR SI Messages, where the SI windows for two or more of the plurality of BR SI Messages overlap; and different SI-NBs are configured for the SI Messages with overlapping SI windows.

According to some aspects, an on-demand SI request is used to request transmission of the BR SI Message.

According to some aspects, the on-demand request is made using an RRCSystemInfoRequest comprising a field to indicate if the request is being made for a BR SI message.

According to some aspects, the on-demand request is made using a PRACH preamble and/or PRACH resource associated with the device coverage level and the BR SI Message.

According to some aspects, the first SI-NB and the second SI-NB are same.

According to some aspects, the following solutions are provided for a reduced capability NR device to acquire an SI message using an SI-NB, where semi-static DL assignments are used to schedule the PDSCH carrying the BR SI message, when using repetition-based enhanced coverage with frequency hopping.

In one aspect, a device is configured to execute the instructions of receiving a BR SI Message configuration for reduced capability NR devices in an RRC message, where the BR SI Message configuration includes an indication of an SI-NB, and an indication of a semi-static scheduling configuration for a PDSCH carrying a Transport Block (TB), where the TB corresponds to an SI Message comprising one or more BW reduced SIBs. The instructions may further include determining the DL assignments used to schedule the PDSCH based on the semi-static scheduling configuration, receiving a PDSCH scheduled by the determined DL assignments, storing the first received transmission for the TB, and attempting to decode the received data.

According to some aspects, the behavior may further include successfully decoding the TB and performing the assigned actions for processing the BW reduced SIB(s) received in the BR SI Message.

According to some aspects, the behavior may further include unsuccessfully decoding the TB, receiving the PDSCH scheduled by a subsequent determined semi-static DL assignment, combining the received data with the stored data for this TB, attempting to decode the combined data, successfully decoding the TB, and performing the assigned actions for processing the BW reduced SIB(s) received in the BR SI message.

According to some aspects, the BR SI message configuration may further includes a hopping configuration, the determining instruction may further include determining the SI-NB of a PDSCH receiving occasion for BR SI message acquisition according to the hopping configuration, and the receiving instruction may further include receiving the PDSCH in the determined SI-NB.

According to some aspects, the hopping pattern configuration may include a hopping interval indicating when the hops should take place in the time domain and a hopping offset indicating how large the hops should be in the frequency domain.

According to some aspects, the SI-NBs in the hopping pattern configuration may correspond to a narrow band BWP.

According to some aspects, the hopping interval configuration corresponds to performing frequency hopping at the start of each sweep of a BR SI message occurring in the BR SI window.

According to some aspects, the RRC message is a SIB1-BR message.

According to some aspects, the SIB1-BR message is received in the initial DL BWP and the SI-NB of the SI message corresponds to a DL BWP that is different than the initial DL BWP.

According to some aspects, the SIB1-BR message is received in a DL BWP that is different than the initial DL BWP.

According to some aspects, the MIB indicates the DL BWP to use for reception of the SIB1-BR message.

According to some aspects, SIB1-BR indicates the DL BWP to use for reception of the SI message.

According to some aspects, the RRC messages includes a configuration for a plurality of BR SI Messages, where the SI windows for two or more of the plurality of BR SI Messages overlap; and different SI-NBs are configured for the SI Messages with overlapping SI windows.

According to some aspects, an on-demand SI request is used to request transmission of a BR SI Message.

According to some aspects, the on-demand request is made using an RRCSystemInfoRequest comprising a field to indicate if the request is being made for a BR SI message.

According to some aspects, the on-demand request is made using a PRACH preamble and/or PRACH resource associated the device coverage level and the BR SI Message.

According to some aspects, the following solutions are provided for a reduced capability NR device to monitor for and receive paging in a PNB, when using repetition-based enhanced coverage with frequency hopping.

In one aspect, a device may be configured to execute the instructions of receiving a paging configuration for reduced capability NR devices in an RRC message, where the RRC message includes an indication of a plurality of PDCCH monitoring occasions for paging, an indication of a plurality of PNBs, and an indication of the number of PDCCH monitoring occasions per SSB. The device may further be configured to execute the instructions of determining its PO based on its identity, determining the PDCCH monitoring occasions for paging associated with its PO, determining its PNB based on its identity, monitoring for reception of a PDCCH addressed to P-RNTI in its PNB during the PDCCH monitoring occasions for paging associated with its PO, and receiving a PDCCH addressed to P-RNTI, where the PDCCH includes Paging DCI used to dynamically schedule a PDSCH and where the Paging DCI includes a field used to indicate the PDSCH narrow band and a field to indicate the PDSCH redundancy version. The device may further be configured to execute the instructions of receiving the PDSCH in the PDSCH narrow band, where the PDSCH includes a Transport Block (TB) corresponding to a Paging Message, storing the first received transmission for the TB, and attempting to decode the received data.

According to some aspects, the behavior further includes successfully decoding the TB and performing the assigned actions for processing the Paging Message.

According to some aspects, the behavior further includes unsuccessfully decoding the TB, monitoring for reception of a PDCCH addressed to P-RNTI in its PNB during the subsequent PDCCH monitoring occasions for paging associated with the PO, and receiving a PDCCH addressed to P-RNTI, where the PDCCH includes Paging DCI used to dynamically schedule a PDSCH and where the Paging DCI includes a field used to indicate the PDSCH narrow band and field to indicate the PDSCH redundancy version. According to some aspects, the behavior may further include receiving the PDSCH in the PDSCH narrow band, where the PDSCH includes a TB corresponding to the Paging Message, combining the received data with the stored data for this TB, attempting to decode the combined data, successfully decoding the TB, and performing the assigned actions for processing the Paging Message.

According to some aspects, the paging configuration further includes a hopping configuration, the device determines the narrow band of the PDCCH monitoring occasion according to the hopping configuration, and the monitoring instruction further include monitoring for reception of the PDCCH addressed to P-RNTI in the determined narrow band.

According to some aspects, the hopping pattern configuration includes a hopping interval indicating when the hops should take place in the time domain and a hopping offset indicating how large the hops should be in the frequency domain.

According to some aspects, the narrow bands in the hopping pattern configuration correspond to a narrowband BWP.

According to some aspects, the hopping interval configuration corresponds to performing frequency hopping at the start of each sweep of a Paging Message occurring in the PO.

According to some aspects, each PNB in the plurality of PNBs corresponds to BWP that is different than the initial DL BWP.

According to some aspects, the RRC message is a SIB1-BR message.

According to some aspects, the SIB1-BR message is received in the initial DL BWP and the SI-NB of the SI message corresponds to a DL BWP that is different than the initial DL BWP.

According to some aspects, the SIB1-BR message is received in a DL BWP that is different than the initial DL BWP.

According to some aspects, the MIB indicates the DL BWP to use for reception of the SIB1-BR message.

According to some aspects, SIB1-BR indicates the DL BWP to use for reception of the SI message.

According to some aspects, the Paging DCI further includes a field to indicate if the paging is for a legacy device or a reduced capability NR device.

According to some aspects, the receiving a PDCCH instruction includes receiving and combining a plurality of PDCCH repetitions carrying identical Paging DCI that schedules a plurality of PDSCH repetitions carrying the Paging Message.

According to some aspects, the behavior includes successfully decoding the TB and performing the assigned actions for processing the Paging Message.

According to some aspects, the behavior includes unsuccessfully decoding the TB, receiving a subsequent PDSCH repetition; where the PDSCH includes a TB corresponding to the Paging Message, combining the received data with the stored data for this TB, attempting to decode the combined data, successfully decoding the TB, and performing the assigned actions for processing the Paging Message.

According to some aspects, the scheduling information included in the identical Paging DCI for the PDSCH carrying the Paging Message corresponding to the $K^{th}$ SSB is relative to the $[(X-1)*S+K]$ PDCCH monitoring occasion for paging in the PO.

According to some aspects, the identical Paging DCI includes a field to indicate the number of repetitions of the PDSCH carrying the Paging Message.

According to some aspects, the RV of the PDSCH is cycled according to a predefined pattern across the repetitions that occur during the PO.

Solution to First Problem

SI Narrowband

According to some aspects, cost/complexity reduction techniques applied for reduced capability NR devices are expected to include a reduced bandwidth; e.g., 24 RBs or less, compared to legacy NR devices. According to some aspects, the NR MIB is transmitted on the PBCH and is contained within the 20 RB bandwidth of the SSB, therefore the same MIB may be used for regular NR devices and reduced capability NR devices. Reception of the NR SIBs may require PDCCH monitoring in a CORESET that is wider than the BW of a reduced capability NR device or reception of PDSCH that is scheduled using any number of PRBs, which means SI transmission in general may occupy too large channel bandwidth to be received by reduced capability NR devices. To address this problem, reduced capability NR devices may acquire BW Reduced (BR) versions of the SIBs that are received in SI narrow bands (SI-NBs), where the bandwidth of an SI-NB is less than or equal to the bandwidth of a reduced capability NR device.

According to some aspects, these separate bandwidth reduced instances of the SIBs may be referred to as SIB1-BR, SIB2-BR, etc. The bandwidth reduced instances of the SIBs may be based on the NR SIB definitions as follows:

SIB1-BR may define the scheduling of other system information blocks and contains information required for initial access. SIB1-BR may be referred to as Remaining Minimum SI (RMSI) for reduced capability NR devices and is periodically broadcast on DL-SCH or sent in a dedicated manner on DL-SCH to UEs in RRC_CONNECTED.

SIB2-BR may contain cell re-selection information, mainly related to the serving cell.

SIB3-BR may contain information about the serving frequency and intra-frequency neighboring cells relevant for cell re-selection (including cell re-selection parameters common for a frequency as well as cell specific re-selection parameters).

SIB4-BR may contain information about other NR frequencies and inter-frequency neighboring cells relevant for cell re-selection (including cell re-selection parameters common for a frequency as well as cell specific re-selection parameters).

SIB5-BR may contain information about E-UTRA frequencies and E-UTRA neighboring cells relevant for cell re-selection (including cell re-selection parameters common for a frequency as well as cell specific re-selection parameters).

SIB6-BR may contain an ETWS primary notification.
SIB7-BR may contain an ETWS secondary notification.
SIB8-BR may contain a CMAS warning notification.
SIB9-BR may contain information related to GPS time and Coordinated Universal Time (UTC).

Alternatively, according to some aspects, to reduce the load on the network for signaling BR SI, the UE may be configured with one or more sets of BR SIBs, and the network may signal an index that is used to "lookup" the set of BR SIBs to apply rather than explicitly signaling the SIBs. The sets of BR SIBs may be configured in the UE using higher layer signaled; e.g., NAS or provisioned using an OAM interface. The MIB may include new fields to assist reduced capability devices in determining the scheduling of SIB1-BR. In one embodiment, a field; e.g., schedulingInfo-SIB1-BR, is defined and used to lookup a scheduling configuration for SIB1-BR. For example, to reduce the signaling associated with reduced capability NR devices in the initial DL BWP, SIB1-BR may be transmitted in a different DL BWP. The schedulingInfoSIB1-BR field in the MIB may be used to lookup a configuration that includes an indication of the DL BWP that is used for transmission of SIB1-BR. Alternatively, rather than looking up a configuration that includes an indication of the DL BWP, the bits in the MIB may be used to indicate the actual DL BWP that is used for transmission of SIB1-BR. The PDSCH carrying SIB1-BR may in the same DL BWP as its scheduling PDCCH. Alternatively, the PDSCH carrying SIB1-BR may be in a different DL BWP than the scheduling PDCCH. The different DL BWP may be signaled dynamically via the PDDCH, using a rules-based mechanism defined per the standard or using a combination thereof.

According to some aspects, the following configuration options, which include scenarios where the PDSCH carrying SIB1-BR is in a different DL BWP than the scheduling PDCCH, may be implemented:

1. SIB1-BR may be scheduled via the MIB in the initial DL BWP. The PDCCH scheduling the PDSCH carrying the SIB1-BR message is also transmitted in the initial DL BWP and the PDSCH is scheduled in the initial DL BWP.
2. SIB1-BR may be scheduled via the MIB in the initial DL BWP. The PDCCH scheduling the PDSCH carrying the SIB1-BR message is also transmitted in the initial DL BWP and the PDSCH is scheduled in a DL BWP that is different than the initial DL BWP.
3. SIB1-BR may be scheduled via the MIB in the initial DL BWP. The PDCCH scheduling the PDSCH carrying the SIB1-BR message is transmitted in a DL BWP that is different than the initial DL BWP and the PDSCH is scheduled in a DL BWP that is different than the initial DL BWP.
4. SIB1-BR may be scheduled via the MIB in the initial DL BWP. The PDCCH scheduling the PDSCH carrying the SIB1-BR message is transmitted in a DL BWP that is different than the initial DL BWP and the PDSCH is scheduled in a DL BWP that is the same as the initial DL BWP.

And in other alternatives, according to some aspects, SIB1-BR may be transmitted in the initial DL BWP and the BR SI Messages may be transmitted in a different DL BWP, where the scheduling of the BR SI Messages is signaled via SIB1-BR.

According to some aspects, a specific configuration value, e.g., '0', may be used to indicate the cell does not support reduced capability NR devices. When a reduced capability NR device determines the cell does not support reduced capability NR devices, the device may take actions to prevent it from accessing the cell. For example, the device may consider the cell as barred in accordance with TS 38.304. Whether or not the UE considers cell re-selection to other cells on the same frequency as the barred cell as allowed or not allowed may be determined by a field in the MIB; e.g., the intraFreqReselection field. Alternatively, the behavior may be specified by the standard as 'allowed' or 'not allowed'. And in another alternative, a field in SIB1-BR may be used to indicate whether or not reduced capability NR UEs are allowed to access the cell.

According to some aspects, the term BR SI message may be used when referring to an SI message that is included of one or more BW reduced SIBs. For BR SI message acquisition, frequency domain resources may be used for PDCCH monitoring occasion(s) correspond to an SI-NB, where an SI-NB corresponds to a set of PRBs in the carrier BW, where the BW of the SI-NB is less than or equal to the BW of the reduced capability NR device. For illustrative purposes, it may be assumed a value of 24 RBs for the BW of the reduced capability NR device, but other values may also be used.

According to some aspects, the scheduling of BR SI messages may be configured via higher layer signaling, e.g., RRC. In one example, SIB1-BR, which may be based on the NR SIB1 definition, is used to signal the scheduling configurations of the BR SI messages, which includes the SI-NB(s) used for reception of the BR SI messages.

In one example, the same SI-NB is used for the PDCCH monitoring occasions for all BR SI messages. In one embodiment, the PDCCH monitoring occasions are determined according to searchSpaceOtherSystemInformation signaled in SIB1-BR.

According to some aspects, if searchSpaceOtherSystemInformation is set to zero, the PDCCH monitoring occasions for BR SI message reception are the same as the PDCCH monitoring occasions for SIB1-BR, where the BW of the frequency domain resources configured for the CORESET associated with the PDCCH monitoring occasions for SIB1-BR are less than or equal to the bandwidth of the reduced capability NR device; e.g., 24 RBs.

According to some aspects, if searchSpaceOtherSystemInformation is not set to zero, the CORESET associated with the search space indicated by searchSpaceOtherSystemInformation is used to configure the SI-NB used for reception of a BR SI message. The frequency DomainResources field of the ControlResourceSet IE, may be defined as a bit field where each bit corresponds to an RB group with a fixed size; e.g., 6 RBs, with grouping starting from the first RB group in the carrier BW. This field may then be used to indicate which RBs in the carrier BW correspond to the SI-NB used for acquisition of the BR SI message. Parameters determining the location and width of the actual carrier or the carrier bandwidth may be signaled to the UE via RRC signaling; e.g., the SCS-SpecificCarrier IE in SIB1-BR.

According to some aspects, if BW of 24 RBs is assumed for reduced capability NR devices, then the SI-NB could be included of at least 1 RB group and up to 4 RB groups which may or may not be contiguous. Alternatively, the number of RBs in an RB group could be defined to be equal to the bandwidth of a reduced capability device; e.g., 24 RBs, thereby requiring fewer bits to signal the SI-NB, but providing less flexibility since the SI-NB may be configured to be equal to the bandwidth of the reduced capability NR device rather than less than or equal to the bandwidth of the reduced capability NR device. In this alternative, the number of RBs in the RB group could be defined per the standard or could be signaled in a new field; e.g., RBGroupSize, in the CORESET IE.

In another alternative, if the bits of the frequency DomainResources field correspond to RB groups spanning a BWP rather than RB groups spanning the carrier BW. In this alternative, the device acquires a BR SI message using an SI-NB contained within the BWP, where the BW of the BWP may be greater than or equal to the BW of the device. Parameters determining the configuration of the BWP that contains an SI-NB may be signaled to the UE via RRC signaling; e.g., the initialDownlinkBWP configuration in SIB1-BR.

In another example, if a different SI-NB may be used for the PDCCH monitoring occasions for each BR SI message. In one embodiment, the SchedulingInfo signaling via SIB1-BR that is associated with a BR SI message may be extended to include a field to configure the SI-NB used for the BR SI message; e.g., a frequency DomainResources field. The frequency DomainResources field included in the SchedulingInfo may be defined as the frequency DomainResources field of the ControlResourceSet IE as described herein. In one alternative, the field may be optionally present; and when present, is used to override the value configured via the CORESET associated with the search space indicated by searchSpaceOtherSystemInformation. An exemplary SchedulingInfo IE, that includes a frequency DomainResources field is shown in FIG. 11.

In another alternative, the SI-NB may be signaled as a narrow band number, where the total number of narrow bands is equal to FLOOR (Num RBs in carrier BW or BWP/Num RBs in SI-NB). An alternative SchedulingInfo IE, that includes an si-narrow band field is shown if FIG. 12.

Figure 13:
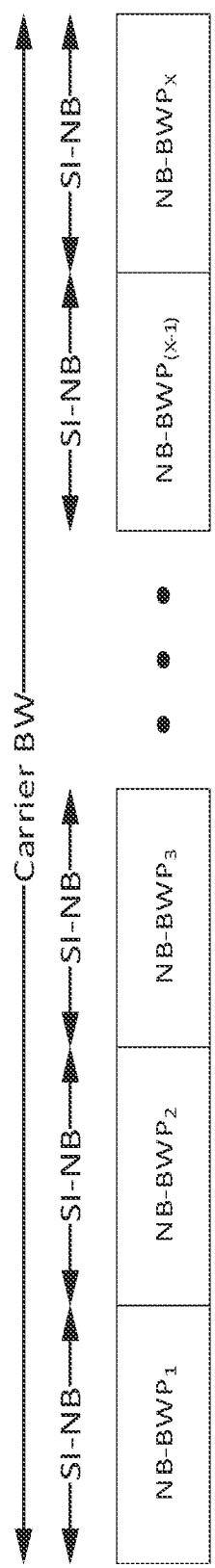
FIG. 13 illustrates a carrier BW included of a plurality of narrowband BWPs.

In another alternative, an SI-NB may correspond to a BWP in a carrier bandwidth included of a plurality of narrow band BWPs, where a narrow band BWP is a BWP with a bandwidth that is less than or equal to the bandwidth of a reduced capability NR device. FIG. 13 is an illustration of a Carrier BW included of a plurality of narrow band BWPs. In this alternative, an SI-NB may be signaled as a BWP index, where the total number of BWPs X is equal to FLOOR (Num RBs in carrier BW/Num RBs in narrow band BWP). A SchedulingInfo IE, that includes an si-BWP field is shown in FIG. 14.

According to some aspects, for scenarios where the number of actual transmitted SSBs is greater than 1, the same SI-NB may be used for transmission of a given BR SI message corresponding to all of the transmitted SSBs. Alternatively, a different SI-NB can be used for transmission of a given BR SI message corresponding to each of the transmitted SSBs. This may be advantageous if for example, the network determines there is interference on a specific set of resources in a given SSB direction. And in another alternative, the SI-NB may be determined as a function of the SSB index. For example, SI-NB index=mod (SSB index, total # of SI-NBs).

A BR SI message is carried on a PDSCH that is dynamically scheduled by a PDCCH masked with SI-RNTI that is received during the PDCCH monitoring occasion(s) associated with the BR SI message. The DCI used to schedule the PDSCH includes a "Frequency Domain Resource Assignment" field that may be used to configure frequency domain resources corresponding to an SI-NB. Alternatively, the SI-NB used for reception of the PDSCH may be assumed to be the same as the SI-NB of the corresponding PDCCH that scheduled the PDSCH. And in another alternative, a rule-based mechanism may be defined to determine the SI-NB of the PDSCH based on the SI-NB of the corresponding PDCCH that scheduled the PDSCH.

In some scenarios, the search space used for the PDCCH monitoring occasions for a BR SI message may overlap with the search space used for the PDCCH monitoring occasions for a legacy SI message. To avoid ambiguity in knowing which type of SI message is being scheduled, a field may be included in the DCI to indicate if the scheduling is for a legacy SI or BR SI. For example, the System Information Indicator field can be extended to 2 bits and defined as shown in FIG. 15.

Alternatively, the PDCCH may be scrambled using a RNTI value reserved for BR SI; e.g., SI-BR-RNTI.

Upon receiving a BR SI message, the UE performs the assigned actions for processing the BW reduced SIB(s) contained in the acquired BR SI message, where the assigned actions may be based on the assigned actions for processing the NR SIBs.

For reduced capability NR devices, SI windows may be allowed to overlap, and the SI messages that overlap are configured to use different SI-NBs, thereby allowing the UE to determine which SI message is being transmitted. Alternatively, different RNTI's may be used for the overlapping SI messages, where the RNTI associated with a given SI message may be provided to the UE using higher layer signaling; e.g., RRC or using a rules-based mechanism defined per the standard.

On Demand Request for BR SI Message

The transmission of separate BR versions of the SIBs increases the signaling overhead. To reduce the signaling overhead according to some aspects, an on-demand SI request may be used to request transmission of a BR SI Message.

In one example, specific PRACH preambles and PRACH resources may be associated with BR SI Messages that are not being broadcast. The mappings between the PRACH preambles and/or PRACH resources and a BR SI Message for on-demand SI requests may be one-to-one, one-to-many or many-to-one. For example, to reduce signaling overhead or minimize the use of preambles and/or resources for reduced capability NR devices, one preamble or resource may be used to request multiple BR SI Messages for reduced capability NR devices.

According to some aspects, the mapping may also be based on coverage level, where the coverage level may be determined by the device based on a measurement of the DL signal, location, etc. For example, a plurality of coverage levels based on DL RSRP may be defined, and a different set of PRACH preambles and/or PRACH resources may be mapped to each coverage level. The UE may first select a set of PRACH preambles and/or PRACH resources associated with the coverage level, and then select a PRACH preamble and/or PRACH resource associated with the desired BR SI Message from the set of PRACH preambles and/or resources associated with the coverage level. The network may transmit the requested BR SI message using method appropriate for the corresponding coverage level. For example, the network may transmit a BR SI Message requested by a reduced capability NR device in a good coverage level with less repetitions compared to a request made by a reduced capability NR device in a poor coverage level.

To avoid ambiguity with on demand SI requests from regular NR devices, different PRACH preambles and/or resources may be used to make on demand SI requests for reduced capability NR devices. For scenarios where SIB1-BR is acquired by reduced capability NR devices, this can be accomplished by configuring the SI-RequestConfig IE in SIB1-BR appropriately; e.g., such that different PRACH preambles and/or PRACH resources are configured compared to the configuration for regular NR devices in SIB1.

In another example, an RRC message; e.g., RRCSystemInfoRequest, shown in FIG. 16 may be used to request transmission of a BR SI Message. To avoid ambiguity with on demand SI requests from regular NR devices, the RRC message used to request a BR SI Message may include a field to indicate if the request is being made for a BR SI message. A reduced capability NR device may set the field to an appropriate value; e.g., TRUE, to indicate it is making a request for a BR SI message. An exemplary RRCSystemInfoRequest message that includes a br-SI-request field is shown in FIG. 16. Alternatively, a new dedicated RRC message just for requesting BR SI may be defined; e.g., RRCSystemInfoRequest.

After making a request for a BR SI Message, the UE may acquire the BR SI Message in the corresponding SI-NB using the procedures described herein.

Paging Narrowband

A reduced capability NR UE may use Discontinuous Reception (DRX) in RRC_IDLE and RRC_INACTIVE state in order to reduce power consumption. The UE monitors one Paging Occasion (PO) per DRX cycle, where a PO is defined as a set of PDCCH monitoring occasions and can consist of multiple time slots (e.g., subframes or OFDM symbols) where paging DCI can be sent. One Paging Frame (PF) is one Radio Frame and may contain one or multiple PO(s) or starting points of a PO.

Cost/complexity reduction techniques applied for reduced capability NR UEs may include a reduced BW; e.g., 24 RBs, compared to legacy NR UEs. Therefore, frequency domain resources may be used for paging monitoring and reception for reduced capability NR UEs correspond to a Paging Narrow band (PNB), where a PNB is defined as a set of PRBs in the carrier BW, where the bandwidth of the set of PRBs is less than or equal to the bandwidth of the reduced capability NR UE. The Paging DCI may include a field to dynamically schedule the frequency domain resources for the PDSCH carrying the Paging Message, where the frequency domain resources may correspond to the same PNB as was used to receive the Paging DCI, a different PNB or a different set of narrowband resources. Alternatively, the frequency domain resources used to schedule the PDSCH may correspond to the PNB and therefore may not be signaled explicitly in the Paging DCI.

In multi-beam operations, the UE may assume the same Paging Message and the same Short Message are repeated in all transmitted beams. The Paging Message may be the same for both RAN initiated paging and CN initiated paging. Alternatively, beam groups may be defined where the same Paging Message and the same Short Message is transmitted in the same beam group but may be different between different beam groups. Which beam group a UE belongs to may be configured via higher layer signaling; e.g., RRC, using a rules-based mechanism defined per the standard or using a combination thereof. When multiple rules are defined and/or used, which rule to apply may also be configurable.

The UE may initiate the RRC Connection Resume procedure upon receiving RAN initiated paging. If the UE receives a CN initiated paging in RRC_INACTIVE state, the UE moves to RRC_IDLE and informs NAS.

The network may configure a plurality of PFs, POs and PNBs which are signaled to the UE via broadcast and/or dedicated signaling; e.g., RRC. The actual PF, PO and PNB used to page a UE may be determined based on the UE identity.

For example, the following formulae may be used to determine the PF, PO and PNB used to page a reduced capability NR UE:

SFN for the PF is determined by:

$$(SFN+PF\_offset) \bmod T = (T \text{ div } N)*(UE\_ID \bmod N)$$

Index (i_s), indicating the index of the PO is determined by:

$$i\_s = \text{floor}(UE\_ID/N) \bmod Ns$$

PNB index indicating the frequency resources used to monitor PNB for paging is determined by:

$$PNB \text{ index} = \text{floor}(UE\_ID/(N*Ns)) \bmod Nn$$

where
- T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied).
- N: number of total paging frames in T
- Ns: number of paging occasions for a PF
- Nn: number of total PNBs configured by the network
- PF_offset: offset used for PF determination
- UE_ID: 5G-S-TMSI mod 1024.

The mod 1024 operation performed in the calculation of the UE_ID may be used to evenly distribute the UEs to 10 different groups that are then used when calculating the PF, PO and PNB. For reduced capability NR devices, the UEs may be distributed to a number of groups that may be different than the number of groups used for legacy NR devices. The value of this parameter may be specified per the standard. One can also envisaged a scenario where multiple values for this parameter may be specified per the standard, and the value the of the parameter that is chosen is based on the value of another configuration parameter; e.g., Nn.

Distributing UEs to PFs, POs, and/or PNBs may be based on service type, mobility, state or other characteristics of the device. For example, it may be desirable to group stationary UEs based on the coverage level. The RSSI value may be used to determine the coverage level. The UE may provide an indication to the network to inform it of the RSSI value or coverage level that is needed for the UE. The PDCCH monitoring occasions for paging are determined according to pagingSearchSpace and firstPDCCH-MonitoringOccasionOfPO if configured.

According to some aspects, when SearchSpaceId=0 is configured for pagingSearchSpace, the PDCCH monitoring occasions for paging are the same as those used to acquire SIB1-BR, and the PNB corresponds to the narrowband used to acquire SIB1-BR.

According to some aspects, when SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

According to some aspects, when SearchSpaceId other than 0 is configured for pagingSearchSpace, the UE monitors the (i_s+1)th PO. A PO is a set of 'S*X' consecutive PDCCH monitoring occasions where 'S' is the number of actual transmitted SSBs determined according to ssb-PositionsInBurst in SIB1-BR and X is the nrofPDCCH-MonitoringOccasionPerSSB-InPO if configured or is equal to 1 otherwise. The $[x*S+K]^{th}$ PDCCH monitoring occasion for paging in the PO corresponds to the $K^{th}$ transmitted SSB, where x=0, 1, . . . , X−1, K=1, 2, . . . , S. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of (i_s+1)th PO is the (i_s+1)th value of the firstPDCCH-MonitoringOccasionOfPO parameter; otherwise, it is equal to i_s*S*X. If X>1, when the UE detects a PDCCH transmission addressed to P-RNTI within its PO, the UE is not required to monitor the subsequent PDCCH monitoring occasions for this PO. The UE monitors for paging using the frequency resources corresponding to the PNB.

Figure 17:
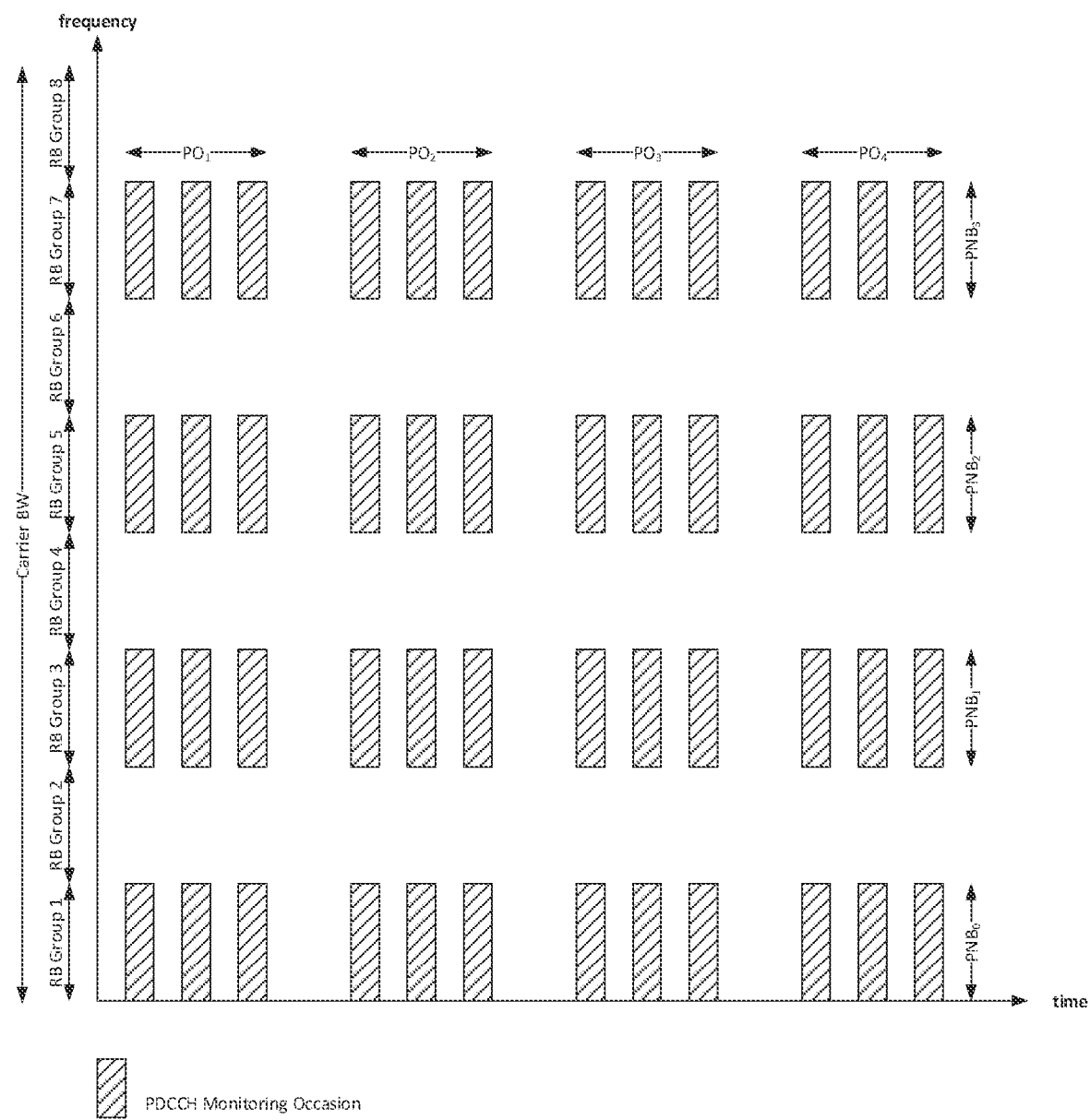
FIG. 17 illustrates a carrier BW included of a plurality of PNBs.

According to some aspects, the proposed plurality of PNBs, from which the UE determines its PNB, is signaled to the UE as part of the Paging Configuration. For example, the CORESET associated with the pagingSearchSpace may be used to indicate the plurality of PNBs configured by the network. In one embodiment, the number of RBs in a PNB may be defined per the standard; e.g., 24 RBs, and the frequency DomainResources field in the ControlResourceSetIE is defined as a bit field where each bit corresponds to an RB group equal to the size of a PNB e.g., the first (left-most/most significant) bit corresponds to the first RB group in the carrier BW, and so on. The bit's value is used to indicate if the RB group is configured as a PNB; e.g., a bit that is set to 1 indicates this RB group is configured as a PNB and a bit that is set to 0) indicates this RB group is not configured as a PNB. Alternatively, the number of RBs in a PNB may be configured dynamically; e.g., as a field in the ControlResourceSetIE. FIG. 17 is an illustration of an example for cell configured with S=3 SSBs, X=1 PDCCH monitoring occasion per SSB, Ns=4 POs per PF and Nn=4 PNBs. It may be assumed the carrier BW is configured with 192 RBs and a PNB is defined as 24 RBs. In this example, the most significant 8 bits of the frequency DomainResources field in the ControlResourceSetIE may be set to a binary value of 10101010b to configure RB groups 1, 3, 5 and 7 as PNBs.

In another alternative, the bits of the frequency DomainResources field correspond to RB groups spanning a BWP rather than RB groups spanning the carrier BW. In this alternative, the device monitors for paging using an PNB contained within the BWP, where the BW of the BWP is greater than or equal to the BW of the device. Parameters determining the configuration of the BWP that contains an PNB may be signaled to the UE via RRC signaling; e.g., the initialDownlinkBWP configuration in SIB1-BR.

Figure 18:
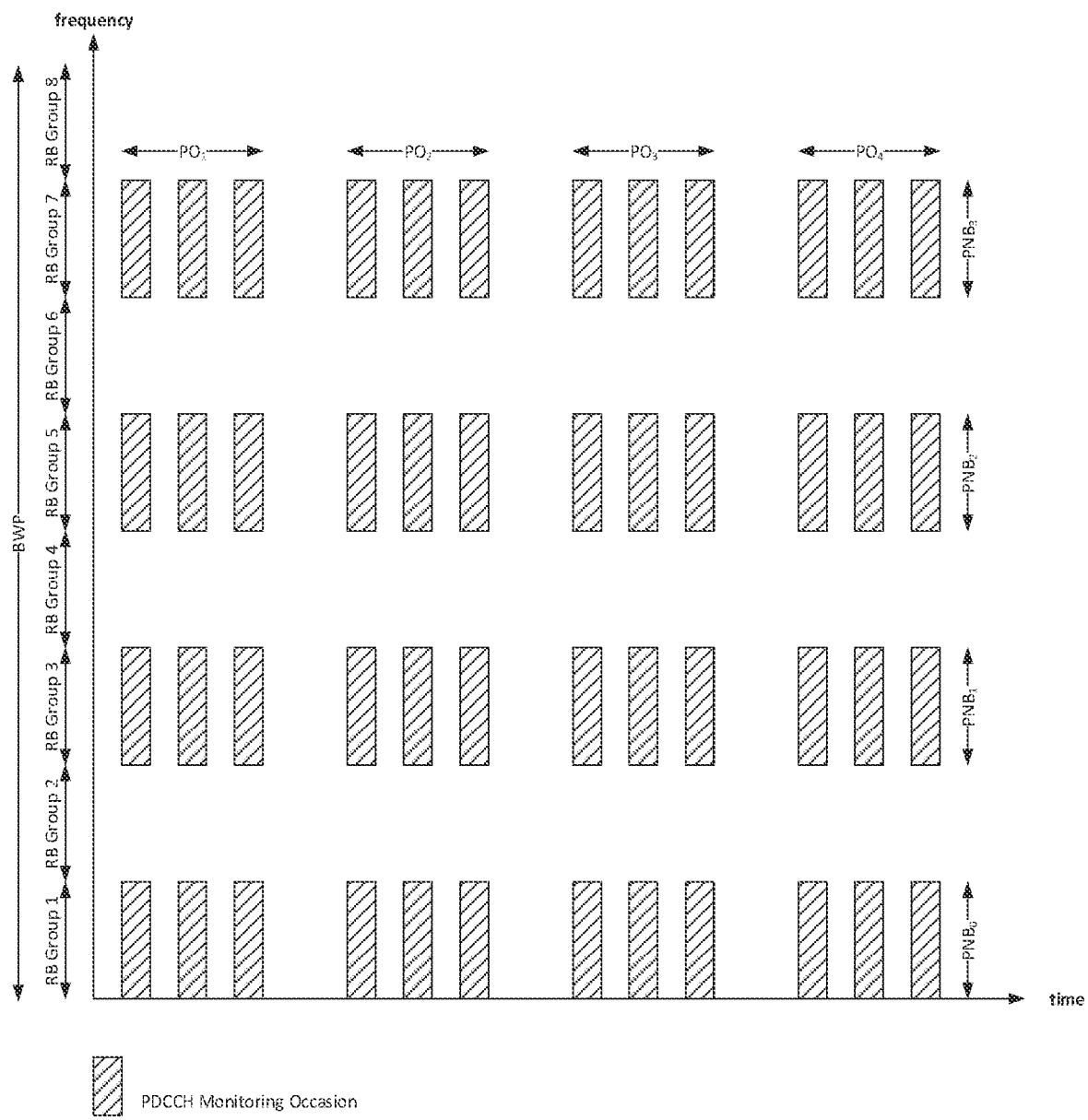
FIG. 18 illustrates a BWP included of a plurality of PNBs.

FIG. 18 is an illustration of an example for cell configured with S=3 SSBs, X=1 PDCCH monitoring occasion per SSB, Ns=4 POs per PF and Nn=4 PNBs. The BWP may be configured with 192 RBs and a PNB is defined as 24 RBs. In this example, the most significant 8 bits of the frequency DomainResources field in the ControlResourceSetIE may be set to a binary value of 10101010b to configure RB groups 1, 3, 5 and 7 as PNBs.

In another alternative, an PNB may correspond to a BWP in a carrier bandwidth included of a plurality of narrow band BWPs, where a narrow band BWP is a BWP with a bandwidth that is less than or equal to the bandwidth of a reduced capability NR device. The PNBs may correspond to the first Nn narrow band BWPs in the carrier bandwidth. An offset may be applied to shift the location of the PNBs in the carrier BW. The granularity of the offset may be expressed as NB-BWPs, relative to the first NB-BWP in the carrier BW; or as RBs relative to the first RB in the carrier BW. Similarly, an offset may also be applied to shift the location of the PNBs relative to each other. Other methods for indicting the PNBs can also be envisaged. For example, a bit field spanning the carrier bandwidth may be defined, where each bit corresponds to narrow band BWP in the carrier BW and the corresponding bit field may be set/cleared to indicate whether or not the narrow band BWP is configured as a PNB.

The network may configure the PNBs to offload paging for reduced capability NR devices to a specific set of BWPs. For example, to offload paging signalling for reduced capability NR devices from the initial DL BWP.

The following configuration options, which include scenarios where the Paging DCI and the Paging Message are transmitted in different DL BWPs can be envisioned:

According to some aspects, Paging DCI is transmitted in the initial DL BWP, and the PDSCH carrying the Paging Message is scheduled in the initial DL BWP.

According to some aspects, Paging DCI is transmitted in the initial DL BWP, and the PDSCH carrying the Paging Message is scheduled in a DL BWP part that is different than the initial DL BWP.

According to some aspects, Paging DCI is transmitted in a DL BWP that is different than the initial DL BWP, and the PDSCH carrying the Paging Message is scheduled in a DL BWP part that is different than the initial DL BWP.

According to some aspects, Paging DCI is transmitted in a DL BWP that is different than the initial DL BWP, and the PDSCH carrying the Paging Message is scheduled in a DL BWP part that is the same as the initial DL BWP.

Figure 19:
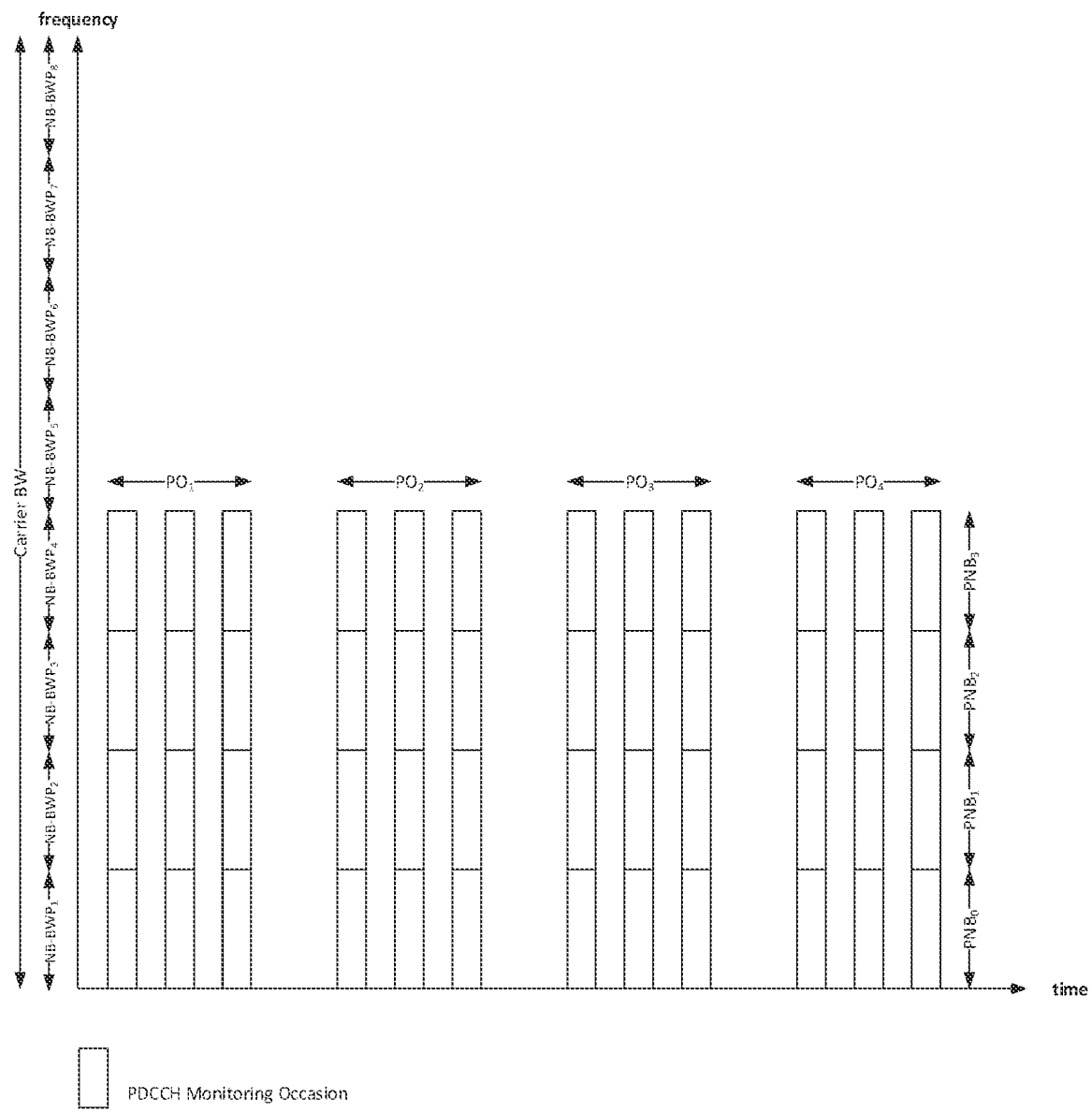
FIG. 19 illustrates a carrier BW Included of a Plurality of Narrowband BWPs where the first Nn=4 BWPs are Configured as PNBs.

According to some aspects, FIG. 19 is an illustration of an example where the first Nn=4 narrow band BWPs in a carrier BWP included of 8 narrow band BWPs are configured as PNBs for cell configured with S=3 SSBs, X=1 PDCCH monitoring occasion per SSB, Ns=4 POs per PF and Nn=4 PNBs.

According to some aspects, Parameters Ns, nAndPagingFrameOffset, nrofPDCCHMonitoringOccasionPerSSB-InPO and the length of default DRX Cycle are signaled in SIB1-BR. The values of N and PF_offset are derived from the parameter nAndPagingFrameOffset. The parameter first-PDCCH-MonitoringOccasionOfPO is signalled in SIB1-BR for paging in initial DL BWP. For paging in a DL BWP other than the initial DL BWP, the parameter first-PDCCH-MonitoringOccasionOfPO is signaled in the corresponding BWP configuration. The parameter Nn may be explicitly signaled in SIB1-BR or implicitly determined from the number of PNBs configured by the CORESET associated with the pagingSearchSpace.

According to some aspects, if the UE has no 5G-S-TMSI, for instance when the UE has not yet registered onto the network, the UE may use as default identity UE_ID=0 in the PF and i_s formulas above.

According to some aspects, 5G-S-TMSI is a 48 bit long bit string as defined in TS 23.501 [6]. 5G-S-TMSI may in the formulae above be interpreted as a binary number where the left most bit represents the most significant bit.

According to some aspects, for scenarios where the number of actual transmitted SSBs is greater than 1, the same PNB may be used for transmission of the Paging Message on all beams. Alternatively, a different PNB can be configured for each SSB. This may be advantageous if for example, the network determines there is interference on a specific set of resources in a given SSB direction.

According to some aspects, for scenarios where reduced capability NR devices acquire the same SI as regular NR devices, e.g., the NR SI, a second pagingSearchSpace may be configured for use by reduced capability NR devices in the NR SI. In one embodiment, a second pagingSearchSpace field; e.g., pagingSearchSpace-BR, may be optionally included in the PDCCH-ConfigCommon IE. The absence of the pagingSearchSpace-BR field may indicate reduced capability NR devices do not receive paging in this BWP. When SearchSpaceId=0 is configured for pagingSearchSpace-BR, the PDCCH monitoring occasions for paging for a reduced capability NR device may be assumed to be the same as the PDCCH monitoring occasions for paging used by a regular NR device. Alternatively, when SearchSpaceId=0 is configured for pagingSearchSpace-BR, the PDCCH monitoring occasions for paging for a reduced capability NR device may be assumed to be the same as for RMSI. When SearchSpaceId other than 0 is configured for paging-SearchSpace-BR, the device monitors for paging in a PNB in accordance with the procedures for paging monitoring by reduced capability NR devices described herein.

In another embodiment, the absence of the paging-SearchSpace-BR field may indicate the PDCCH monitoring occasions for paging for a reduced capability NR device may be assumed to be the same as the PDCCH monitoring occasions for paging used by a regular NR device.

In some scenarios, the search space used for the paging monitoring occasions for a reduced capability NR device may overlap with the search space used for the paging monitoring occasions for a legacy device. To avoid ambiguity in knowing which type of device is being paged, a field may be included in the DCI to indicate if the paging is for a legacy device or a reduced capability NR device. In one example, a bit in the Short Message in the Paging DCI can be used to signal the information. Alternatively, the PDCCH could be scrambled using a RNTI value reserved for the reduced capability NR devices; e.g., BR-P-RNTI.

Solution to the Second Problem

SI Message Repetition Using Semi-Static PDSCH Scheduling

The NR SI Acquisition procedure supports multiple transmissions of an SI message within the SI window. Each transmission is dynamically scheduled by a PDCCH masked with SI-RNTI that is received during the PDCCH monitoring occasions for SI message reception occurring in the SI window. If the corresponding PDSCH carrying the SI message is not decoded successfully, the UE combines data from subsequent retransmissions and attempts to decode the combined data. This improves the robustness of the SI acquisition procedure, provided the PDCCH that schedules the PDSCH carrying the SI message is received reliably.

Reduced capability NR devices may not be able to receive the PDCCH with the same reliability as a legacy NR device, thereby making acquisition of the SI less robust. To address this issue, BR SI messages may be transmitted without an associated PDCCH, and semi-static scheduling is used instead to schedule the PDSCH carrying a BR SI message. SIB1-BR may be used to signal the scheduling of the BR SI messages. The UE may combine data from for a given BR SI message across multiple SI windows occurring in the same modification period.

The PDSCH corresponding to each BR SI message may be scheduled using a different semi-static scheduling configuration. Alternatively, parameters that are configured the same across all SI messages can be provided in a common configuration, while parameters that are different can be provided for each BR SI message separately. And in another alternative, the same semi-static configuration can be applied for all BR SI messages. The semi-static scheduling information may be provided to the UE using higher layer signaling; e.g., RRC, defined per the standard or using a combination thereof.

The semi-static scheduling configuration may include information related to the following:
  transport block size;
  frequency domain resource assignment;
  time domain resource assignment;
  VRB-to-PRB mapping;
  modulation and coding scheme;
  redundancy version;
  PDSCH mapping type.

One can also envisaged the semi-static scheduling configuration including additional parameters, such as the frequency hopping configuration described herein.

Transport Block Size

Reduced capability NR devices are expected to have less processing capability compared to regular NR devices. To reduce the processing requirements for a reduced capability NR device, the transport block size for a BR NR Message may be semi-statically configured rather than requiring the UE to determine it dynamically.

Different BR SI Messages may be included of different BR SIBs, resulting in a different Transport block size. Therefore, transport block size may be configured independently for each BR SI message. In one embodiment, the SchedulingInfo associated with a BR SI message may be extended to include a field to configure the transport block size. This field, e.g., si-TBS, may be defined as an enumeration type consisting of the possible transport block sizes that may be configured as illustrated in the exemplary SchedulingInfo IE used for semi-static scheduling of a PDSCH carrying an SI message shown in FIG. 23.

Alternatively, the same transport block size may be configured for all the BR SI messages. In one embodiment, the SI-SchedulingInfo may be extended to include a field to configure the transport block size used for all BR SI Messages.

Frequency Domain Resource Assignment

The frequency domain resource assignment is used to configure the frequency domain resources, e.g., PRBs, used for the PDSCH carrying the BR SI message. The frequency domain resource assignment may correspond to an SI-NB as defined herein. In one embodiment, the SchedulingInfo associated with a BR SI message may be extended to include a field to configure the frequency domain resource assignment for the BR SI message. This field, e.g., frequencyDomainResources, may be defined as a bit field where each bit corresponds to a 6 RB group with grouping starting from the first RB group in the BWP. If it is assumed BW of 24 RBs for reduced capability NR devices, then the frequency domain resource assignment could be included of 1-4 contiguous RB groups. Alternatively, the number of RBs in an RB group could be defined to be equal to the bandwidth of a reduced capability device, e.g., 24 RBs, thereby requiring fewer bits to signal the frequency domain resource assignment, but providing less flexibility since the SI-NB may be configured to be equal to the bandwidth of the reduced capability NR device rather than less than or equal to the bandwidth of the reduced capability NR device. In this alternative, the number of RBs in the RB group could be defined per the standard or could be signalled in a new field; e.g., RBGroupSize, that may be included in the semi-static scheduling configuration.

Time Domain Resource Assignment

Figure 20:
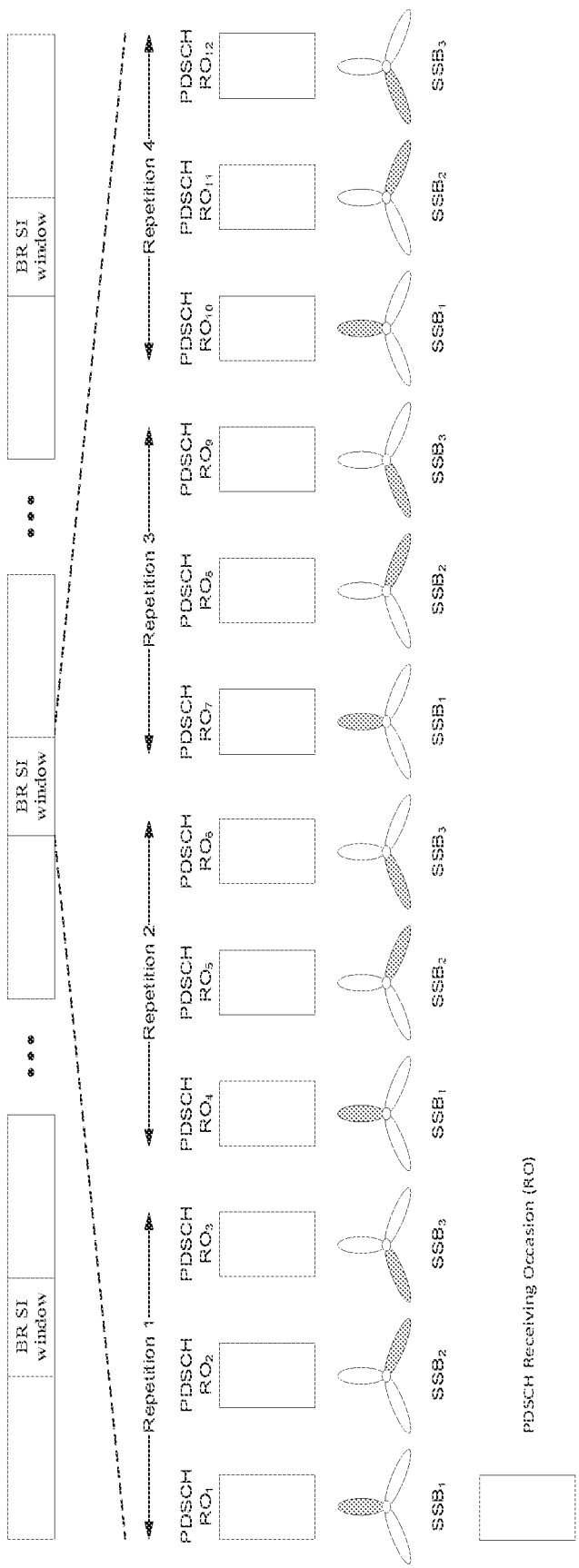
FIG. 20 illustrates a PDSCH receiving occasion pattern.

The time domain resource assignment is used to configure the time domain resources; e.g., OFDM symbols, used for the PDSCH carrying the BR SI message. Te time domain resource assignment may correspond to a plurality of PDSCH receiving occasions (RO), where a PDSCH receiving occasion is defined as the time during which a PDSCH is received in accordance with the provided semi-static scheduling configuration. PDSCH receiving occasions which are not overlapping with UL symbols (determined according to tdd-UL-DL-ConfigurationCommon) are sequentially numbered from one in the BR SI window. The [x×N+K]th PDSCH receiving occasion(s) for an SI message in a BR SI window corresponds to the Kth transmitted SSB, where x=0, 1, ..., X−1; K=1, 2, ..., N; N is the number of actual transmitted SSBs determined according to ssb-PositionsInBurst in SIB1 and X is equal to CEIL (number of PDSCH receiving occasions in BR SI window/N). FIG. 20 is an illustration of PDSCH receiving occasions pattern in a BR SI window for the scenario where N=3 SSBs and X=4 BR SI message repetitions for each SSB.

Figure 21:
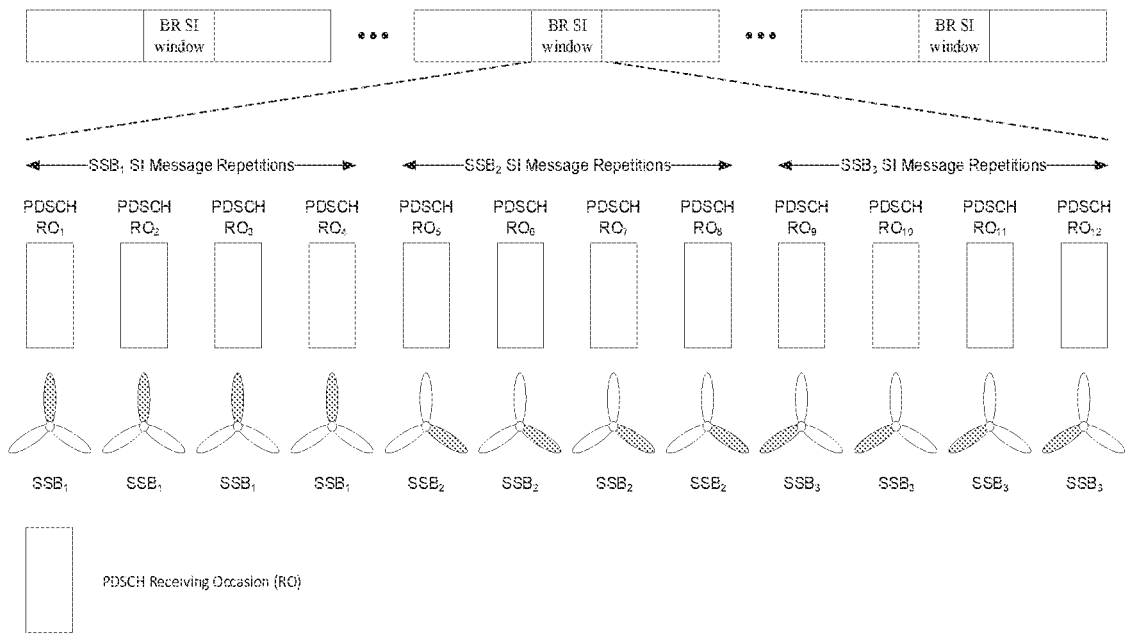
FIG. 21 illustrates an alternative PDSCH receiving occasion pattern.

An alternative PDSCH receiving occasion configuration may be defined, where the [(K−1)×X+x]th PDSCH receiving occasion(s) for an SI message in a BR SI window corresponds to the Kth transmitted SSB, where x=1, 2, ..., X; K=1, 2 .... N; N is the number of actual transmitted SSBs determined according to ssb-PositionsInBurst in SIB1 and X is equal to CEIL (number of PDSCH receiving occasions in BR SI window/N). This alternative PDSCH receiving occasion configuration is shown in FIG. 21.

The time domain resource assignments of the PDSCH receiving occasions may be signalled to the UE as a plurality of PDSCH receiving occasions occurring in the SI window for the concerned BR SI message. In one embodiment, a plurality of potential PDSCH receiving occasions occurring in the radio frame containing the start of the SI window for the concerned BR SI message is signalled to the UE, where the configuration includes a receiving slot periodicity and offset defining the slots where the potential PDSCH receiving occasions occur in the radio frame containing the start of the concerned BR SI window; a duration, D, defining the number of consecutive slots containing PDSCH receiving occasions; a set of starting receiving symbols within a receiving slot defining the starting symbol(s) of the potential PDSCH receiving occasion(s) in the slot; and a duration, L, defining the allocation length of the potential PDSCH receiving occasion(s). The actual PDSCH receiving occasions may correspond to those PDSCH receiving occasions occurring within the concerned BR SI message window.

Other alternatives for signalling the time domain resource assignments can also be envisaged. In one example the mechanism for signalling the starting symbols within a receiving slot is based on receiving an indication of a first receiving symbol within a receiving slot and subsequent receiving symbols within the receiving slot being defined using a gap parameter that is relative to the previous receiving symbol.

Figure 22:
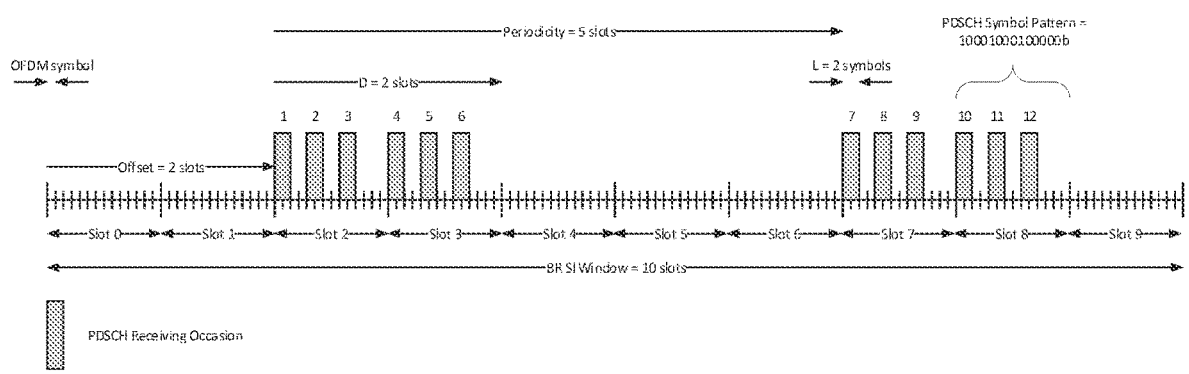
FIG. 22 illustrates time domain resource assignment for PDSCH Receiving Occasions.

According to some aspects, FIG. 22 is an illustration of an example with a receiving slot periodicity of 5 slots; an offset of 2 slots; a duration D of 2 slots; a set of starting to receive symbols corresponding to symbols 0, 4 and 8; and an allocation length L of 2 symbols.

In this example, if it is assumed the [x×N+K]th PDSCH receiving occasion(s) for an SI message in a BR SI window corresponds to the Kth transmitted SSB, and the number of SSBs N=3, then the set of PDSCH receiving occasions corresponding to SSB1 is {1, 4, 7, 10}; the set corresponding to SSB2 is {2, 5, 8, 11}; and the set corresponding to SSB3 is {3, 6, 9, 12}.

Alternatively, if is assumed the [(K−1)×X+x]th PDSCH receiving occasion(s) for an SI message in a BR SI window corresponds to the Kth transmitted SSB, and the number of SSBs N=3, then the set of PDSCH receiving occasions corresponding to SSB1 is {1, 2, 3, 4}; the set corresponding to SSB2 is {5, 6, 7, 8}; and the set corresponding to SSB3 is {9, 10, 11, 12}.

VRB-to-PRB Mapping

The semi-static scheduling configuration may include information to indicate non-interleaved or interleaved VRB-to-PRB mapping.

Modulation and Coding Scheme

The semi-static scheduling configuration may include information to indicate the modulation and coding scheme used for the PDSCH carrying a BR SI message. In one example, the modulation order, Qm, may be defined per the standard; e.g., the standards may specify QPSK as the modulation order used for PDSCH carrying a BR SI Message.

Alternatively, the semi-static scheduling configuration may be included of an index; e.g., IMCS, that is used to lookup the MCS from a table such as Table 5.1.3.1-1 in TS 38.214.

Redundancy Version

For a PDSCH carrying BR reduced SI message that is semi-statically scheduled, the Redundancy Version (RV) may be cycled according to a predefined pattern across the repetitions that occur during an BR SI window. For example, the pattern may consist of 4 unique RVs that repeats after the 4th transmission; e.g., {0, 1, 2, 3}, {0, 2, 3, 1}, etc.

Alternatively, the RV may be a function of the subframe number or slot number used for transmission of the BR SI message. In one embodiment, RV=ceiling(3/2*k) modulo 4, where k=i modulo 4, and i=0, 1, 2, nsw−1, where i denotes the slot number in the BR SI window nsw.

PDSCH Mapping Type

The semi-static scheduling configuration may include information to indicate Type A or Type B as the PDSCH mapping type.

Paging Message Repetition and Combining

To improve the robustness of the Paging procedure for reduced capability NR UEs, a repetition-based coverage enhancement solution may use Paging Message repetition and combining for reception of the Paging Message by reduced capability NR UEs.

In one embodiment, a PO is defined as a set of PDCCH monitoring occasions (MO) that can consist of multiple time slots (e.g., subframes or OFDM symbols) where Paging DCI can be sent. In multi-beam operations, the UE assumes the same Paging Message is repeated in all transmitted beams.

The PDCCH monitoring occasions for paging may be determined according to pagingSearchSpace as specified in TS 38.213 [5], firstPDCCH-MonitoringOccasionOfPO and nrofPDCCH-MonitoringOccasionPerSSB-InPO if configured as specified in TS 38.331 [2].

According to some aspects, when SearchSpaceId=0 is configured for pagingSearchSpace, the PDCCH monitoring occasions for paging are the same as those used to acquire SIB1-BR.

According to some aspects, when SearchSpaceId other than 0 is configured for pagingSearchSpace, the UE monitors the (i_s+1)th PO. A PO is a set of 'S*X' consecutive PDCCH monitoring occasions where 'S' is the number of actual transmitted SSBs determined according to ssb-PositionsInBurst in SIB1-BR and X is the nrofPDCCH-MonitoringOccasionPerSSB-InPO if configured or is equal to 1 otherwise. The [x*S+K]th PDCCH monitoring occasion for paging in the PO corresponds to the Kth transmitted SSB, where x=0, 1 . . . , X−1, K=1, 2, . . . , S. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of (i_s+1)th PO is the (i_s+1)th value of the firstPDCCH-MonitoringOccasionOfPO parameter; otherwise, it is equal to i_s*S*X.

Figure 24:
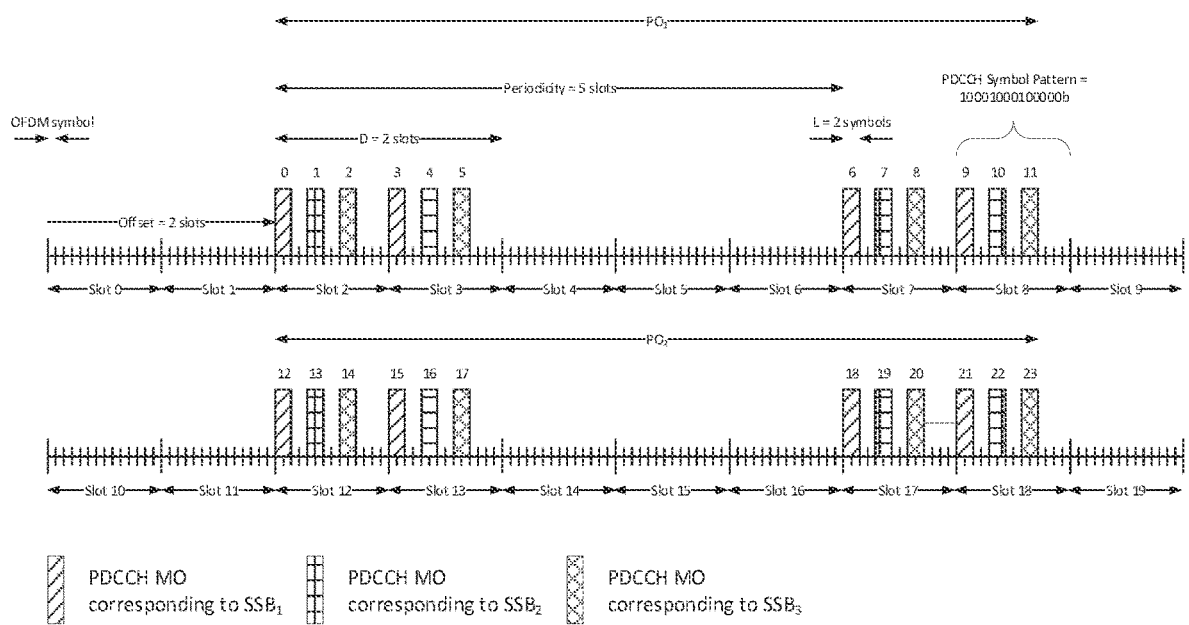
FIG. 24 illustrates PDCCH monitoring occasions Pattern (S=3, X=4, Ns=2).

According to some aspects, FIG. 24 is an illustration of a PDCCH monitoring occasion pattern for a scenario where S=3 SSBs, X=4 PDCCH monitoring occasions per SSB and Ns=2 POs per PF.

Figure 25:
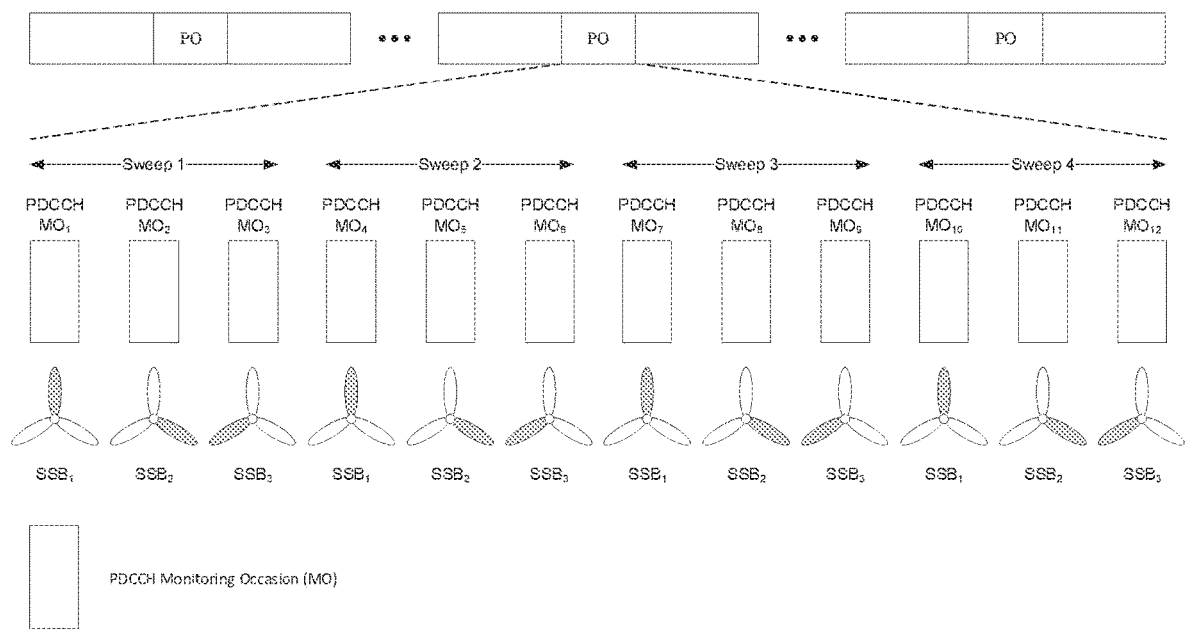
FIG. 25 illustrates sweeps of PDCCH monitoring occasions in a PO (S=3, X=4).

According to some aspects, each consecutive set of S PDCCH monitoring occasions for paging can be viewed as corresponding to a sweep of the SSBs providing coverage in the cell, where the number of sweeps corresponds to the parameter X; e.g., the number of PDCCH monitoring occasions per SSB. FIG. 25 is an illustration showing how the PDCCH monitoring occasions for paging are grouped into sweeps for a scenario where S=3 SSBs and X=4 PDCCH monitoring occasions per SSB.

If X>1, the UE may assume the same Paging Message is transmitted for repetitions of the Paging Message for a given beam. In one embodiment, the bits of the PDSCH carrying the retransmitted Paging Message are assumed to be identical to the bits of the original PDSCH transmission. Alternatively, a different RV of the PDSCH transmission may be used on subsequent repetitions of the Paging Message for a given beam during the PO, where the RV is signaled in the Paging DCI. When the UE detects a first PDCCH transmission addressed to P-RNTI within its PO, and the UE successfully decodes the corresponding Paging Message, the UE is not required to monitor the subsequent PDCCH monitoring occasions for the PO. If the UE does not successfully decode the corresponding Paging Message, the UE stores the data it attempted to decode and monitors the subsequent PDCCH monitoring occasions for the PO. For every subsequent detection of a PDCCH transmission addressed to P-RNTI during the PO, the UE combines the received data with the stored data and attempts to decode the combined data. The UE continues to monitor the subsequent PDCCH monitoring occasions for the PO until the Paging Message is decoded successfully or all PDCCH monitoring occasions in the PO have been monitored. The Paging DCI may include a field to dynamically schedule the frequency domain resources for the PDSCH carrying the Paging Message, where the frequency domain resources may correspond to the same PNB as was used to receive the Paging DCI, a different PNB or a different set of narrow band resources. Alternatively, the frequency domain resources used to schedule the PDSCH may correspond to the PNB and therefore may not be signaled explicitly in the Paging DCI.

When paging a reduced capability NR UE, one paging strategy is to always transmit the paging using the maximum number of repetitions. However, for scenarios where the UEs that need to be paged are in good coverage, this could result in unnecessary signalling overhead. Therefore, when a UE needs to be paged, the AMF may provide an indication to the gNB of the repetition level that may be needed to reach the UE. In one embodiment, the gNB may use a repetition level corresponding to the largest repetition level needed to reliably transmit the Paging Message to the UEs being paged during the PO. For devices that move frequently, it may be difficult to estimate the required repetition level. Therefore, the device may provide an indication of its mobility state to the network to assist it in determining whether or not the required repetition level may have to change due to mobility.

Paging DCI and Paging Message Repetition and Combining

Complexity reduction techniques applied for reduced capability NR devices can make reception of the PDCCH and PDSCH unreliable, which can decrease the robustness of the Paging procedure. To address this issue, repetitions of the PDCCH carrying the Paging DCI may be transmitted during the PDCCH monitoring occasions for paging are received and combined by the UE to improve the robustness of its reception; and the Paging DCI is used to dynamically schedule DL assignments for reception of repetitions of the PDSCH carrying the Paging Message that that are received and combined by the UE to improve the robustness of its reception.

To enable PDCCH combining, PDCCH carrying the Paging DCI may be transmitted during the PDCCH monitoring occasions for paging using a fixed MCS and a fixed set of resources in the PNB. The MCS and the set of resources used to receive PDSCH in the PNB may be provided to the UE using higher layer signaling, e.g., RRC, defined per the standard or using a combination thereof. For example, the UE may assume the Paging DCI is transmitted on a PDCCH using QPSK modulation using all PRBs of the PNB. Once a UE successfully receives the PDCCH, it is not required to receive and combine further repetitions of the PDCCH carrying the Paging DCI during the PO.

Since the UE may not be able to successfully decode the Paging DCI until multiple repetitions of the PDCCH have been received, the scheduling information may be included in the Paging DCI for the PDSCH carrying the Paging Message corresponding to the Kth SSB is relative to the [(X−1)*S+K] PDCCH monitoring occasion for paging in the PO; e.g., the last sweep of the PDCCH carrying the Paging DCI.

The Paging DCI, which may be based on the DCI format 1_0 with CRC scrambled by P-RNTI as described herein, may include a field to indicate the number of repetitions of the PDSCH carrying the Paging Message, a field to indicate the time domain resources, e.g., OFDM symbols, used for reception of the PDSCH repetitions, and a field to indicate the frequency domain resource assignment, where the resource assignment may indicate the narrow band that is used for reception of the PDSCH.

The RV of each PDSCH repetition may be explicitly signalled in the Paging DCI, but this may increase the overhead. Rather than explicitly signalling the RV in the Paging DCI, the RV of the PDSCH carrying the Paging Message may be cycled according to a predefined pattern across the repetitions that occur during the PO, thereby enabling the UE to determine the RV of a given PDSCH repetition without having it explicitly signalled. For example, the pattern may consist of 4 unique RVs that repeats after the 4th PDSCH transmission; e.g., {0, 1, 2, 3}, {0, 2, 3, 1}, etc. Alternatively, the bits of all repetitions PDSCH may be assumed to be identical to the bits of the original PDSCH transmission.

The AMF may provide an indication of the repetition level to a gNB, as described herein. For scenarios where the UEs being paged are in good coverage, the repetition level needed to Page the UEs reliably may be less than the maximum. For scenarios where the repetition level used for transmission of the PDCCH carrying the Paging DCI is less than the maximum, the scheduling information for the for the PDSCH carrying the Paging Message corresponding to the Kth SSB could still be relative to the [(X−1)*S+K] PDCCH monitoring occasion for paging in the PO. However, this may introduce unnecessary latency, since the PDSCH transmissions may not commence until after a time corresponding to the maximum number of sweeps of the PDCCH carrying the Paging DCI. Therefore, the Paging DCI may include a field to indicate the actual number of PDCCH repetitions per SSB that were used. If this value is denoted as X', then the scheduling information for the PDSCH carrying the Paging Message corresponding to the Kth SSB may be relative to the [(X'−1)*S+K] PDCCH monitoring occasion for paging in the PO; e.g., the X' sweep of the PDCCH carrying the Paging DCI. The field indicating the number of PDCCH repetitions may provide the value directly. Alternatively, to reduce signalling overhead, the value may be encoded according to a set of predefined rules. For example, a 2-bit field corresponding to an index may be used to look up the value corresponding to the number of PDCCH repetitions from a predefined set, where the set to use is determined based on the value of nrofPDCCH-MonitoringOccasionPerSSB-InPO as follows:

nrofPDCCH-MonitoringOccasionPerSSB-InPO=1: {1}
nrofPDCCH-MonitoringOccasionPerSSB-InPO=2: {1, 2}
nrofPDCCH-MonitoringOccasionPerSSB-InPO=4: {1, 2, 4}
nrofPDCCH-MonitoringOccasionPerSSB-InPO=8: {1, 2, 4, 8}

The field indicating the number of PDSCH repetitions may provide the value directly. Alternatively, to reduce signalling overhead, the value may be encoded according to a set of predefined rules. For example, a 3-bit field corresponding to an index may be used to look up the value corresponding to the number of PDSCH repetitions from a predefined set, where the set to use is determined based on the value of the field used to schedule the PDCCH repetitions as follows:

00: {1, 2, 4, 8, 16, 32, 64, 128}
01: {4, 8, 16, 32, 64, 128, 192, 256}
10: {32, 64, 128, 192, 256, 384, 512, 768}
11: {192, 256, 384, 512, 768, 1024, 1536, 2048}

If the UE successfully decodes the PDSCH carrying the Paging Message, it is not required to receive and combine subsequent PDSCH transmissions. If the UE does not successfully decode the PDSCH, it stores the data it attempted to decode; and combines the received data for subsequent PDSCH repetitions with the stored data and attempts to decode the combined data. The UE continues to receive and combine data from subsequent PDSCH repetitions until the PDSCH is decoded successfully or all scheduled PDSCH repetitions have been received.

Solution to the Third Problem

SI Message Repetition with Frequency Hopping

In this solution, frequency hopping may be used for transmissions corresponding to repetitions of a BR SI message. Frequency hopping may be used in combination with any of the SI Acquisition solutions described herein. For example, when frequency hopping is used in combination with solutions where the PDSCH carrying the BR SI message is dynamically scheduled, the frequency hopping can be applied to the narrow band used for the PDCCH monitoring occasions used for SI message acquisition. And when the frequency hopping is used in combination with the solutions where the PDSCH carrying the BR SI message is semi-statically scheduled, the frequency hopping can be applied to the narrow band used for the PDSCH receiving occasions used for SI message acquisition.

In one embodiment, a narrow band is configured for a BR SI Message. The configured narrow band corresponds to the narrowband that is used for the first PDCCH monitoring occasion occurring in the SI window; and the narrow band used for a subsequent PDCCH monitoring occasion occurring in the SI window is determined as an offset; e.g., HoppingOffset, relative to the narrow band used for the previous PDCCH monitoring occasion. A parameter; e.g., NumHoppingNBs, may be used to determine the number of narrow bands used for frequency hopping. A parameter, HoppingInterval, may be used to determine when the frequency hopping occurs; e.g., the number of consecutive PDCCH monitoring occasions over which the narrow band stays the same before hopping to another narrow band.

The following equation may be used to determine the narrow band of the ith PDCCH monitoring occasion occurring in a BR SI window:

NBi=Configured NB, for i=0
NBi=(NB(i−1)+[((i−1) MOD HoppingInterval+1) DIV NumHoppingNBs]*HoppingOffset) MOD NumHoppingNBs, for i>0

Note: In the above equation, the determined narrow band wraps back to the beginning of the set of narrow bands using modulo arithmetic.

Figure 26:
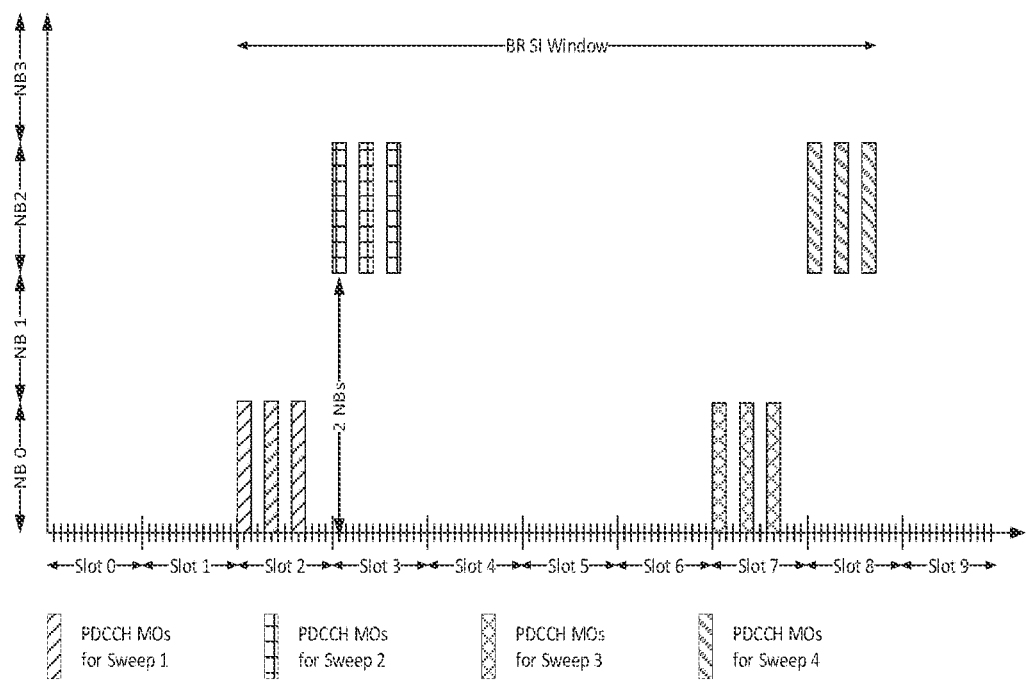
FIG. 26 frequency hopping for SI message transmission (HoppingOffset=2, HoppingInterval=3, NumHoppingNBs=2).
Figure 27:
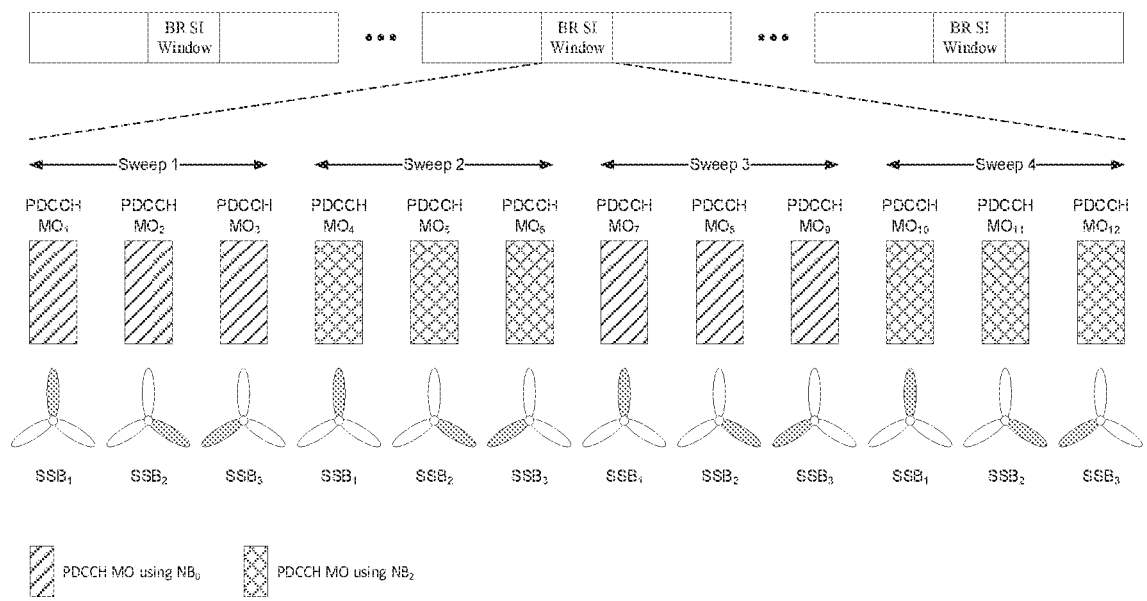
FIG. 27 illustrates frequency hopping for SI message transmission (N=3, X=4, HoppingOffset=2, HoppingInterval=3, NumHoppingNBs=2).

For scenarios where multiple SSBs are transmitted, it may be desirable to perform frequency hopping every N PDCCH monitoring occasions, where N is the number of actual transmitted SSBs. This configuration corresponds to performing frequency hopping at the start of each sweep of a BR SI message occurring in the BR SI window. FIG. 26 is an illustration of a hopping configuration where HoppingOffset=2, HoppingInterval=3 and NumHoppingNBs=2. This hopping configuration could be used to perform frequency hopping at the start of each sweep for a cell configured with N=3 SSBs and X=4 PDCCH monitoring occasions per SSB as shown in FIG. 27.

Figure 28:
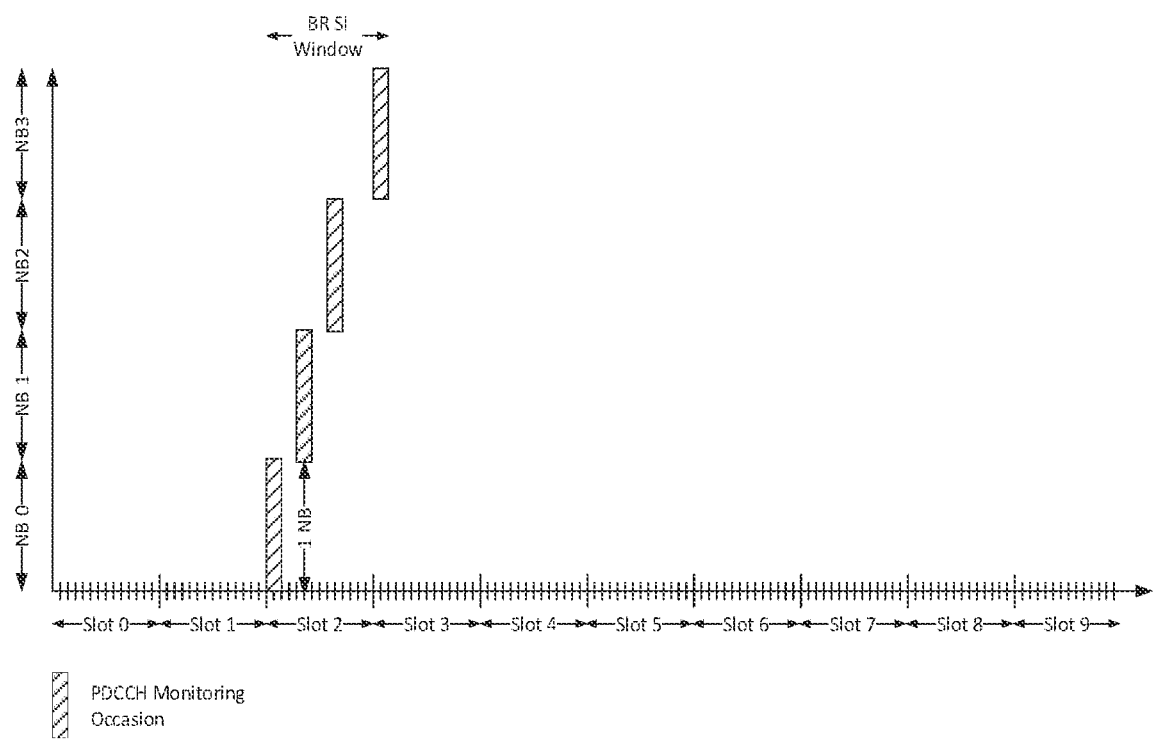
FIG. 28 illustrates frequency hopping for SI message transmission (HoppingOffset=1, HoppingInterval=1, NumHoppingNBs=4).
Figure 29:
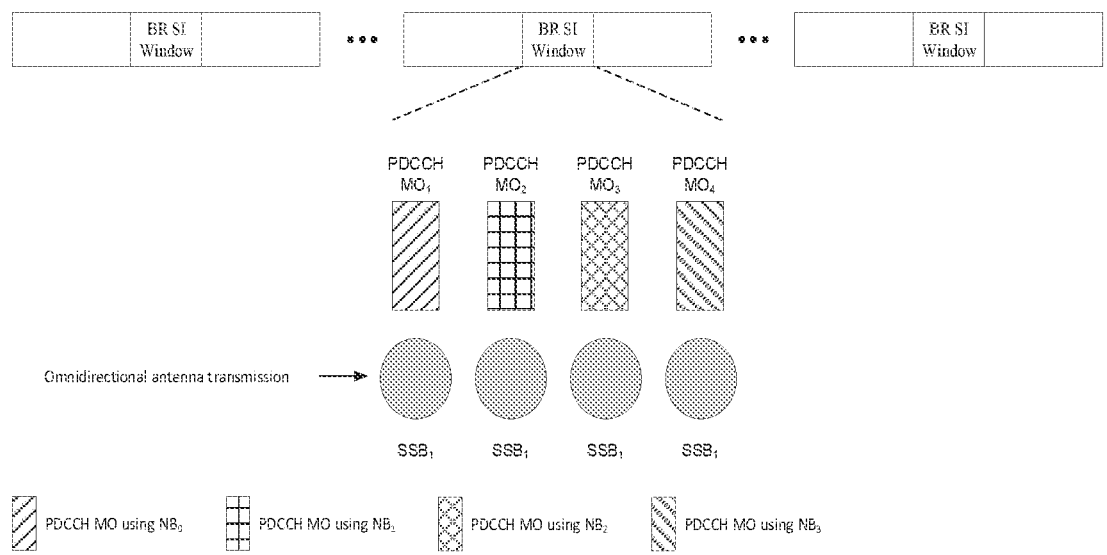
FIG. 29 illustrates frequency hopping for SI message transmission (N=1, X=4, HoppingOffset=1, HoppingInterval=1, NumHoppingNBs=4).

For scenarios where 1 SSB is transmitted; e.g., when using an omnidirectional antenna, it may be desirable to perform frequency hopping every PDCCH monitoring. FIG. 28 is an illustration of a hopping configuration where HoppingOffset=1, HoppingInterval=1 and NumHoppingNBs=4. This hopping configuration could be used to perform frequency hopping every PDCCH monitoring occasion for a cell configured with N=1 SSBs and X=4 PDCCH monitoring occasions per SSB as shown in FIG. 29.

The frequency hopping configuration parameters may be configured independently for each BR SI message. Alternatively, parameters that are configured the same across all BR SI messages can be provided in a common configuration, while parameters that are different can be provided for each BR SI message separately. And in another alternative, the same configuration may be applied for all BR SI messages. The semi-static scheduling information may be provided to the UE using higher layer signaling; e.g., RRC, defined per the standard or using a combination thereof.

In one example, a narrow band, e.g., the narrow band that is used for the first PDCCH monitoring occasion occurring in the BR SI window, is configured for each BR SI message independently, and the remaining frequency hopping parameters are configured in a common configuration that applies for all BR SI Messages. An exemplary SI-SchedulingInfo IE that may be used for configuring the frequency hopping parameters is shown in FIG. 30. In this example, a parameter to enable/disable frequency hopping; e.g., si-freqHoppingControl, is also defined as part of the common frequency hopping configuration.

And in another alternative, the si-narrow band field may be defined in the SchedulingInfo IE as shown above, but the fields for the common frequency hopping parameters; e.g., si-Hopping, si-HoppingOffset, si-HoppingInterval and si-NumHoppingNBs are defined at the top level of the SIB1-BR message.

And in yet another alternative; e.g., when performing frequency hopping at the start of each sweep, the frequency hopping parameters freqHoppingControl, HoppingOffset, NumHoppingNBs may be explicitly signaled using one of the methods described herein, while the value of the HoppingInterval parameter may be implicitly signaled as the number of actual transmitted SSBs determined according to ssb-PositionsInBurst in SIB1-BR; e.g., the number of PDCCH monitoring occasions in a sweep.

In the above examples, the same frequency hopping parameters are applied for the PDCCH carrying the DCI and PDSCH carrying the SI Message. One can also envisaged configurations where different sets of frequency hopping parameters are signaled for the PDCCH and PDSCH. And in another alternative, the frequency hopping parameters for the PDCCH may be signaled as described above and the frequency hopping parameters for the PDSCH may be signaled via the DCI.

The narrow bands the UE hops to may be defined such that they span the carrier BW and may or may not be contained within the same BWP. Alternatively, the narrow bands may be defined such that they are contained within the same BWP. And in another alternative, the narrow bands may be defined such that each narrow band corresponds to a BWP in a carrier bandwidth included of a plurality of narrow band BWPs, where a narrow band BWP is a BWP with a bandwidth that is less than or equal to the bandwidth of a reduced capability NR device.

Paging Message Repetition with Frequency Hopping

Transmission of the Paging DCI/Paging Message in a PNB makes it more susceptible to fading, which may prevent a reduced capability NR device from being able to be paged reliably. To address this problem, frequency hopping may be performed for repetitions of the Paging DCI/Paging Message. Frequency hopping may be used in combination with any of the Paging solutions described herein.

In one embodiment, the narrow band for the 1st PDCCH monitoring occasion for paging corresponds to the PNB determined based on the UE identity as described herein; and the narrow band for subsequent PDDCH monitoring occasions for paging is determined as an offset; e.g., HoppingOffset, relative to the narrowband used for the previous PDCCH monitoring occasion for paging. A parameter, HoppingInterval, may be used to determine when the frequency hopping occurs; e.g., the number of consecutive PDCCH monitoring occasions over which the narrow band stays the same before hopping to another narrow band.

The following equation may be used to determine the narrow band of the ith PDCCH monitoring occasion for paging occurring in a PO:

NBi=PNB, for i=0
NBi=(NB(i−1)+[((i−1) MOD HoppingInterval+1) DIV NumHoppingNBs] *HoppingOffset) MOD NumHoppingNBs, for i>0

Note: In the above equation, the determined narrow band wraps back to the beginning of the set of narrow bands using modulo arithmetic.

Figure 31:
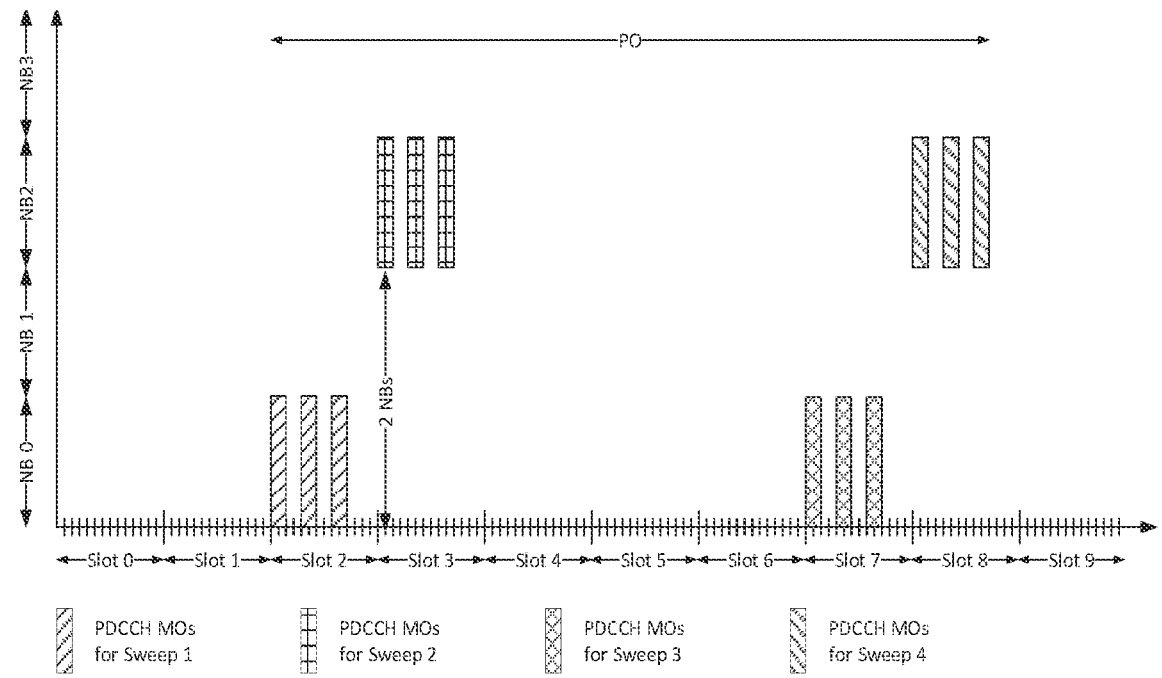
FIG. 31 illustrates a frequency hopping for paging message transmission (HoppingOffset=2, HoppingInterval=3, NumHoppingNBs=2).
Figure 32:
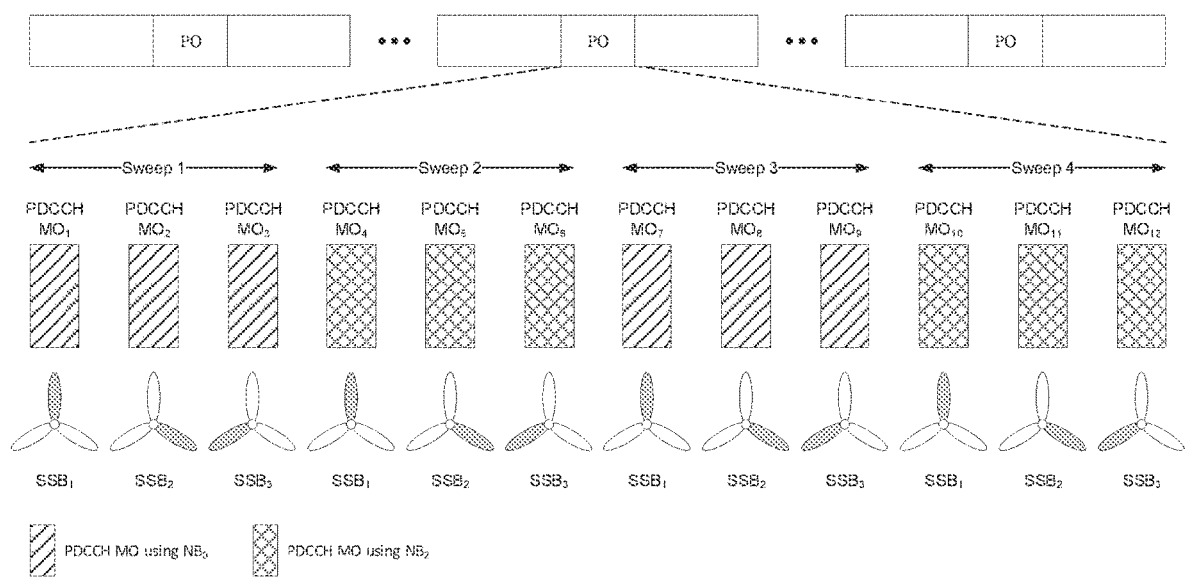
FIG. 32 illustrates Frequency Hopping for Paging Message transmission (S=3, X=4, HoppingOffset=2, HoppingInterval=3, NumHoppingNBs=2).

For scenarios where multiple SSBs are transmitted, it may be desirable to perform frequency hopping every S PDCCH monitoring occasions, where S is the number of actual transmitted SSBs. This configuration corresponds to performing frequency hopping at the start of each sweep of a Paging Message occurring in the PO. FIG. 31 is an illustration of a hopping configuration where HoppingOffset=2, HoppingInterval=3 and NumHoppingNBs=2. This hopping configuration could be used to perform frequency hopping at the start of each sweep for a cell configured with S=3 SSBs and X=4 PDCCH monitoring occasions per SSB as shown in FIG. 32. In this illustration, it may be assumed that the PNB determined based on the UE identity corresponds to NB0.

Figure 33:
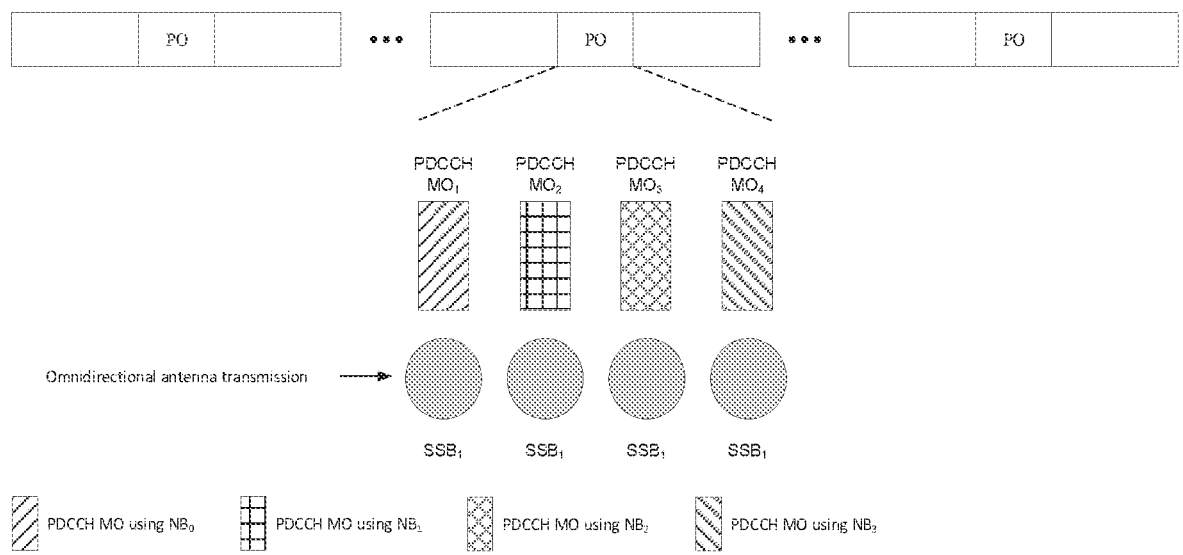
FIG. 33 illustrates frequency hopping for paging message transmission (HoppingOffset=1, HoppingInterval=1, NumHoppingNBs=4).

For scenarios where 1 SSB is transmitted; e.g., when using an omnidirectional antenna, it may be desirable to perform frequency hopping every PDCCH monitoring. FIG. 33 is an illustration of a hopping configuration where HoppingOffset=1, HoppingInterval=1 and NumHoppingNBs=4. This hopping configuration could be used to perform frequency hopping every PDCCH monitoring occasion for a cell configured with N=1 SSBs and X=4 PDCCH monitoring occasions per SSB as shown in FIG. 34.

The frequency hopping configuration parameters may be signalled to the UE via higher layer signalling e.g., RRC. For example, the frequency hopping parameters may be signalled as part of the Paging Configuration signalled via SIB1-BR. An exemplary PCCH-Config IE that may be used for configuring the frequency hopping parameters is shown in FIG. 35. In this example, a parameter to enable/disable frequency hopping; e.g., freqHoppingControl, is also defined as part of the frequency hopping configuration.

The frequency hopping parameters may also be signalled as part of a set of common configuration parameters in SIB1-BR that apply for multiple procedures; e.g., SI acquisition, Paging, etc. In one embodiment, the frequency hopping parameters signalled in the SchedulingInfo IE used for configuring frequency hopping parameters described herein may also be applied for paging.

In the above examples, the same frequency hopping parameters are applied for the PDCCH carrying the Paging DCI and PDSCH carrying the Paging Message. One can also envisaged configurations where different sets of frequency hopping parameters are signalled for the PDCCH and PDSCH. And in another alternative, the frequency hopping parameters for the PDCCH may be signalled as described above and the frequency hopping parameters for the PDSCH may be signalled via the Paging DCI.

The narrowbands the UE hops to may be defined such that they span the carrier BW and may or may not be contained within the same BWP. Alternatively, the narrowbands may be defined such that they are contained within the same BWP. And in another alternative, the narrowbands may be defined such that each narrowband corresponds to a BWP in a carrier bandwidth included of a plurality of narrowband BWPs, where a narrowband BWP is a BWP with a bandwidth that is less than or equal to the bandwidth of a reduced capability NR device.

What is claimed is:

1. A method implemented by a Wireless Transmit/Receive Unit (WTRU), the method comprising:
    receiving configurations of a set of physical resource blocks (PRBs), a plurality of synchronization signal blocks (SSBs), and a set of physical downlink control channel (PDCCH) monitoring occasions for scheduling of a physical downlink shared channel (PDSCH) carrying system information (SI) messages, wherein each PRB in the set of PRBs is associated with an SSB of the plurality of SSBs;
    determining a first SSB of the plurality of SSBs for receiving a first SI message;
    determining a first PRB of the set of PRBs, wherein the first PRB is associated with a first PDCCH monitoring occasion;
    receiving a PDCCH transmission during the first PDCCH monitoring occasion and at a frequency location indicated by the first PRB; and
    receiving, based on information received in the PDCCH transmission, a first PDSCH transmission, wherein the first PDSCH transmission comprises the first SI message.

2. The method of claim 1, wherein the configurations of the set of the PRBs comprise a plurality of frequency ranges.

3. The method of claim 1, wherein the configurations of the set of PRBs comprise configurations of a plurality of system information narrowbands (SI-NBs).

4. The method of claim 1, wherein the configurations of the set of PRBs are received in a radio resource control (RRC) message.

5. The method of claim 4, wherein the RRC message is a system information block type 1 bandwidth reduced (SIB1-BR) message.

6. The method of claim 5, wherein the SIB1-BR message is received in an initial downlink bandwidth part (DL BWP) and a first system information narrowband (SI-NB) of the configurations corresponds to a second downlink bandwidth part (DL BWP) that is different than the initial DL BWP.

7. The method of claim 5, wherein a Master Information Block (MIB) indicates a downlink bandwidth part (DL BWP) to use for reception of the SIB1-BR message.

8. The method of claim 1, wherein the first SSB of the plurality of SSBs for receiving the first SI message is different than remaining minimum system information (RMSI) or SIB1.

9. The method of claim 1, wherein the PDCCH transmission comprises Downlink Control Information (DCI) used to dynamically schedule a second PDSCH transmission.

10. The method of claim 9, wherein the DCI further comprises a field to indicate if an SI is for a legacy device or a reduced capability New Radio (NR) device.

11. A wireless transmit/receive unit (WTRU) comprising one or more processors and memory storing instructions that, when executed by the one or more processors, cause the WTRU to:
    receive configurations of a set of physical resource blocks (PRBs), a plurality of synchronization signal blocks (SSBs), and a set of physical downlink control channel (PDCCH) monitoring occasions for scheduling of a physical downlink shared channel (PDSCH) carrying system information (SI) messages, wherein each PRB in the set of PRBs is associated with an SSB of the plurality of SSBs;
    determine a first SSB of the plurality of SSBs for receiving a first SI message;
    determine a first PRB of the set of PRBs, wherein the first PRB is associated with a first PDCCH monitoring occasion;
    receive a PDCCH transmission during the first PDCCH monitoring occasion and at a frequency location indicated by the first PRB; and
    receive, based on information received in the first-PDCCH transmission, a first PDSCH transmission, wherein the first PDSCH transmission comprises the first SI message.

12. The WTRU of claim 11, wherein the configurations of the set of the PRBs comprise a plurality of frequency ranges.

13. The WTRU of claim 11, wherein the configurations of the set of PRBs comprise configurations of a plurality of system information narrowbands (SI-NBs).

14. The WTRU of claim 11, wherein the configurations of the set of PRBs are received in a radio resource control (RRC) message.

15. The WTRU of claim 14, wherein the RRC message is a system information block type 1 bandwidth reduced (SIB1-BR) message.

16. The WTRU of claim 15, wherein the SIB1-BR message is received in an initial downlink bandwidth part (DL BWP) and a first system information narrowband (SI-NB) of the configurations corresponds to a second downlink bandwidth part (DL BWP) that is different than the initial DL BWP.

17. The WTRU of claim 15, wherein a Master Information Block (MIB) indicates a downlink bandwidth part (DL BWP) to use for reception of the SIB1-BR message.

18. The WTRU of claim 11, wherein the first SSB of the plurality of SSBs for receiving the first SI message is different than remaining minimum system information (RMSI) or SIB1.

19. The WTRU of claim 11, wherein the PDCCH transmission comprises Downlink Control Information (DCI) used to dynamically schedule a second PDSCH transmission.

20. The WTRU of claim 19, wherein the DCI further comprises a field to indicate if an SI is for a legacy device or a reduced capability New Radio (NR) device.

\* \* \* \* \*